US011942728B2

(12) United States Patent
Dedmon et al.

(10) Patent No.: US 11,942,728 B2
(45) Date of Patent: Mar. 26, 2024

(54) ELECTRICAL CONNECTOR SYSTEM WITH DIFFERENTIAL PAIR CABLE INTERFACE

(71) Applicant: Molex, LLC, Lisle, IL (US)

(72) Inventors: Zachary Dedmon, Knoxville, TN (US); Timothy Kelly, Chicago, IL (US); Jason Reed, Auburn Hills, MI (US)

(73) Assignee: Molex, LLC, Lisle, IL (US)

( * ) Notice: Subject to any disclaimer, the term of this patent is extended or adjusted under 35 U.S.C. 154(b) by 379 days.

(21) Appl. No.: 17/437,060

(22) PCT Filed: Mar. 12, 2020

(86) PCT No.: PCT/US2020/022205

§ 371 (c)(1),
(2) Date: Sep. 8, 2021

(87) PCT Pub. No.: WO2020/185978

PCT Pub. Date: Sep. 17, 2020

(65) Prior Publication Data

US 2022/0166171 A1 May 26, 2022

Related U.S. Application Data

(60) Provisional application No. 62/817,926, filed on Mar. 13, 2019.

(51) Int. Cl.
*H01R 13/6582* (2011.01)
*H01R 13/405* (2006.01)
(Continued)

(52) U.S. Cl.
CPC ....... *H01R 13/6582* (2013.01); *H01R 13/405* (2013.01); *H01R 13/502* (2013.01);
(Continued)

(58) Field of Classification Search
CPC ......................... H01R 13/6582; H01R 13/405; H01R 13/502; H01R 13/516; H01R 13/6477;
(Continued)

(56) References Cited

U.S. PATENT DOCUMENTS 5,114,355 A 5/1992 Kimmel et al.
9,543,706 B2 * 1/2017 Zhang .................. H01R 12/724
(Continued)

FOREIGN PATENT DOCUMENTS

CN 1045663 A 9/1990
CN 201097404 Y 8/2008
(Continued)

OTHER PUBLICATIONS

International Preliminary Report on Patentability received for PCT Application No. PCT/US2020/022205, dated Aug. 25, 2021, 5 pages.
(Continued)

*Primary Examiner* — Abdullah A Riyami
*Assistant Examiner* — Nader J Alhawamdeh

(57) ABSTRACT

A connector includes first and second sets of conductive terminals aligned in rows. Insulative housings surround intermediate sections of the terminals. A first insulative insert partially surrounds tail sections of the first set of terminals, and a second insulative insert partially surrounds tail sections of the second set of terminals such that separated passageways which are aligned in rows are formed. A conductive shield partially surrounds the housings and the inserts.

20 Claims, 31 Drawing Sheets

(51) Int. Cl.
*H01R 13/502* (2006.01)
*H01R 13/516* (2006.01)
*H01R 13/6477* (2011.01)

(52) U.S. Cl.
CPC ....... *H01R 13/516* (2013.01); *H01R 13/6477* (2013.01); *H01R 2201/26* (2013.01)

(58) Field of Classification Search
CPC .............. H01R 2201/26; H01R 12/724; H01R 13/6581
See application file for complete search history.

(56) References Cited

U.S. PATENT DOCUMENTS

| | | | | |
|---|---|---|---|---|
| 10,741,957 | B2 | 8/2020 | Hara | |
| 2007/0243757 | A1 | 10/2007 | Wan et al. | |
| 2009/0042450 | A1 | 2/2009 | Zheng et al. | |
| 2009/0047839 | A1* | 2/2009 | Wu | H01R 27/00 439/660 |
| 2010/0046891 | A1 | 2/2010 | Sabo | |
| 2010/0055980 | A1 | 3/2010 | Chen et al. | |
| 2013/0171885 | A1 | 7/2013 | Zhang | |
| 2015/0280375 | A1* | 10/2015 | Xu | H01R 13/6594 439/638 |
| 2016/0036165 | A1* | 2/2016 | Phillips | H01R 13/6461 439/607.05 |
| 2022/0166171 | A1* | 5/2022 | Dedmon | H01R 13/502 |

FOREIGN PATENT DOCUMENTS

| | | | |
|---|---|---|---|
| CN | 102687351 | A | 9/2012 |
| CN | 203326218 | U | 12/2013 |
| CN | 204633049 | U | 9/2015 |
| CN | 106684595 | A | 5/2017 |
| KR | 20160036476 | A | 4/2016 |
| WO | 2011130465 | A2 | 10/2011 |

OTHER PUBLICATIONS

International Search Report and Written Opinion received for PCT Application No. PCT/US2020/022205, dated Jul. 2, 2020, 7 pages.

Extended European Search Report received for EP Application No. 20769553.7, dated Oct. 31, 2022, 08 Pages.

* cited by examiner

ELECTRICAL CONNECTOR SYSTEM WITH DIFFERENTIAL PAIR CABLE INTERFACE

RELATED APPLICATIONS

This application is a national phase of PCT/US2020/022205, filed on Mar. 12, 2020, which claims priority to U.S. Provisional Application No. 62/817,926, filed Mar. 13, 2019, which is are incorporated herein by reference in their entireties.

FIELD OF THE DISCLOSURE

The present invention relates to the field of electrical connectors and, in particular, multi-conductor shielded and unshielded electrical connectors used in cable harnesses of vehicles.

DESCRIPTION OF RELATED ART

Typically, traditional wire harness manufacturing presents a "single wire" approach to the manufacture of wire harnesses used in vehicles (i.e., a single lead wire is terminated to a terminal). With significant increases in the volume and complexity of in-car electronics, networking solutions that offer low-cost, high speed transmission and bandwidth are becoming ever more necessary. In many instances, certain applications require high data rate transfer and use of a balanced or impedance tuned differential pair transmission links are required. The use of "twisted pair" or "twin-axial" cables are employed to interconnect various components within a vehicle.

BRIEF SUMMARY

A connector system is provided that is used for connecting a wire harness to interconnect these various devices. The connector system includes a first connector and a second connector for complete mechanical and electrical connection and utilizing a shielded twisted pair or twin-axial cables. The electrical connectors include a plurality of pairs of spatially and geometrically arranged electrical terminals configured in grouped pairs within a shielded sub-connector or module that are retained in an upper housing of a first connecter of the connector system.

An electrical connector includes first and second sets of conductive terminals aligned in rows. Insulative housings surround intermediate sections of the terminals. A first insulative insert partially surrounds tail sections of the first set of terminals, and a second insulative insert partially surrounds tail sections of the second set of terminals such that separated passageways which are aligned in rows are formed. A conductive shield partially surrounds the housings and the inserts.

To better understand the above-described objectives, characteristics and advantages of the present disclosure, embodiments, with reference to the drawings, are provided for detailed explanations.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
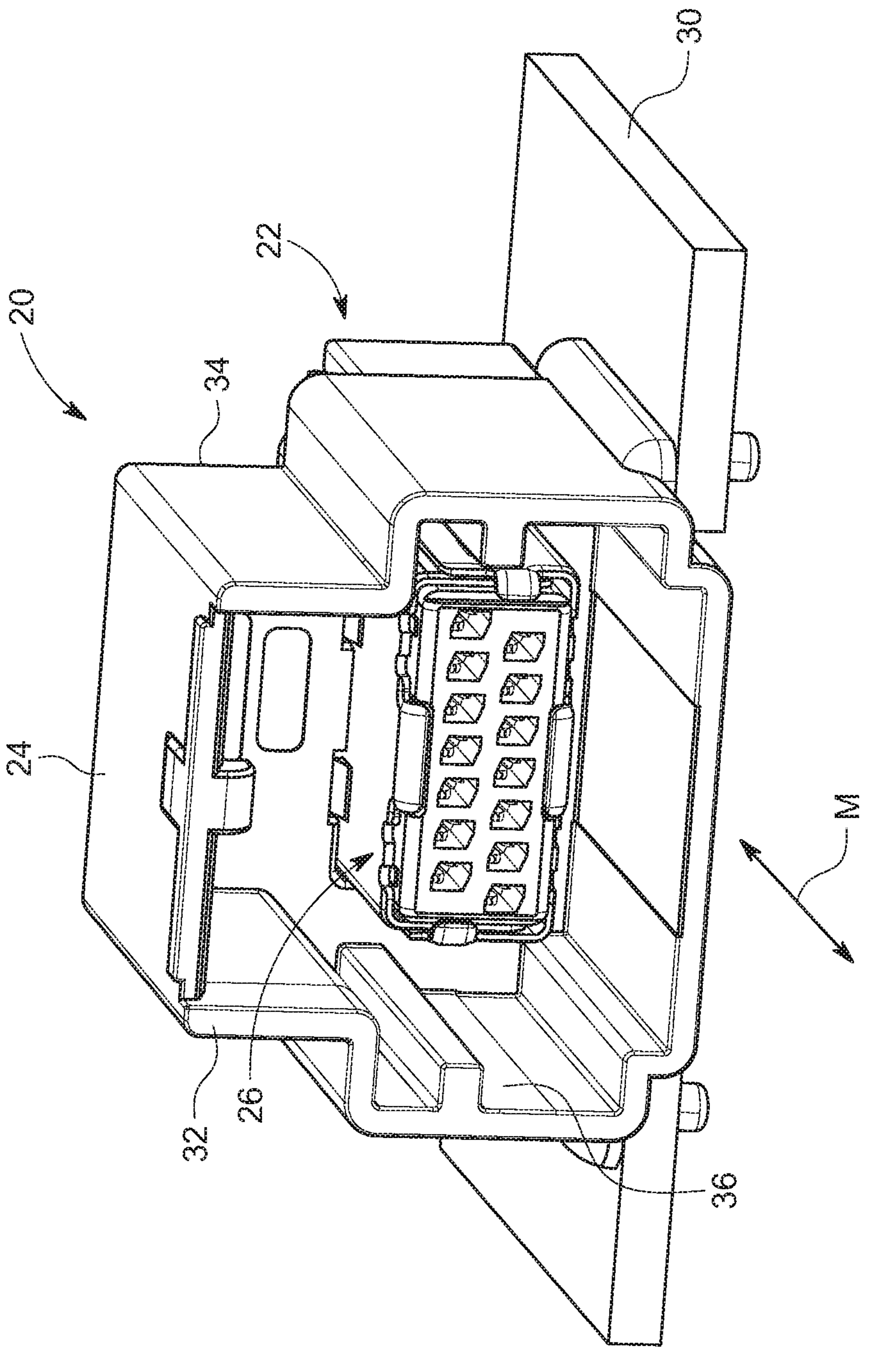
FIG. 1 depicts a rear perspective view of a connector system mounted on a printed circuit board.
Figure 2:
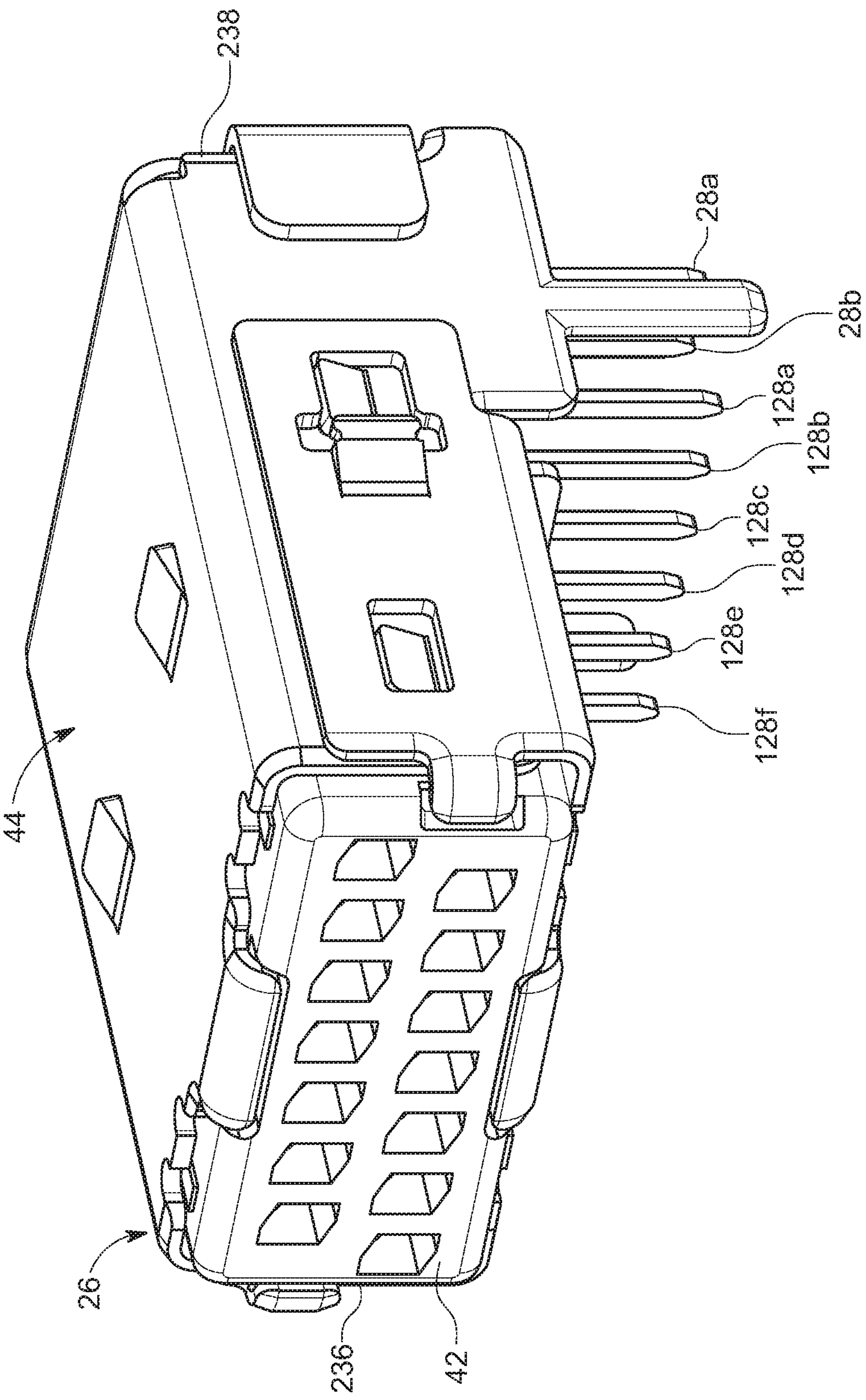
FIG. 2 depicts a rear perspective view of a terminal module of the connector system.

The detailed description that follows describes exemplary embodiments and is not intended to be limited to the expressly disclosed combination(s). Therefore, unless otherwise noted, features disclosed herein may be combined to form additional variations that were not otherwise shown for purposes of brevity.

While the preferred embodiment of the disclosure has been shown and described, it will be apparent to those skilled in the art that changes and modifications may be made therein without departing from the spirit of the disclosure, the scope of which is defined by the appended claims. Like members are designated by like reference characters.

The term, "Connected Car" is an umbrella term used to encompass many elements of in-car connectivity from infotainment to assisted vehicle technology and full autonomy. Additional uses include vehicles that communicate with each other and the associated outside infrastructure combined with the growing use of mobile devices and other new driver-assistance technologies. The use of high-speed connectivity joins together all the electronics systems of the car, including the instrument cluster, the infotainment and the telematics systems.

Directional terms such as front, rear, horizontal, vertical and the like are used for ease in explanation, and do not denote a required orientation in use.

A connector system 20 is disclosed for an in-vehicle networking system, which may be an in-vehicle Ethernet networking system. The connector system 20 includes an electrical connector 22 having an insulating housing 24 that retains a terminal module 26 having a plurality of electrically conductive signal terminals 28*a-f*, 128*a-f* and configured to mate with a second connector (not shown) having an intermating insulating housing that retains a corresponding plurality of electrically conductive terminals configured to mate with the signal terminals 28*a-f*, 128*a-f* in the electrical connector 22 along a mating direction M. The electrical connector 22 is configured to mate with a component 30. In an embodiment as shown in FIG. 1, the component 30 is a printed circuit board and the signal terminals 28*a-f*, 128*a-f* are surface mounted or through mounted to the circuit board in a known manner. In another embodiment, the component 30 are wires (not shown) to which the signal terminals 28*a-f*, 128*a-f* are wire bonded in a known manner.

The housing 24 includes a rear connector mating end 32, an opposite front end 34 and a passageway 36 extending therebetween. The terminal module 26 seats partially within the passageway 36 and extends forwardly from the front end 34 for connection to the component 30. The housing 24 may engage with circuit board in a known manner.

In a first embodiment, as best shown in FIGS. 1-24, the terminal module 26 includes an upper terminal block 38 and a lower terminal block 138 which are stacked on top of each other in a stacked arrangement and are engaged with each other, an upper insulative insert 40 operatively coupled to the terminal blocks 38, 138, a lower insulative insert 140 operatively coupled to the terminal blocks 38, 138, a rear insulative housing 42 engaged with the terminal blocks 38, 138, and an electrically conductive shield 44 which secures the terminal blocks 38, 138, the inserts 40, 140 and the rear housing 42 together. The upper and lower inserts 40, 140 are interengaged and sandwich the signal terminals 28*a-f*, 128*a-f* therebetween as described herein. The inserts 40, 140 allows dielectric material to be positioned in areas between the signal terminals 28*a-f*, 128*a-f*, therefore adjusting dielectric constants between the signal terminals 28*a-f*, 128*a-f* and terminal pairs. The upper terminal block 38 includes the signal terminals 28*a-f* and an insulative housing 46 disposed therearound. The signal terminals 28*a-f* are spaced apart from each other and form an upper row in the stacked arrangement. The lower terminal block 138 includes the signal terminals 128*a-f* and an insulative housing 146 disposed therearound. The signal terminals 128*a-f* are spaced apart from each other and form a lower row in the stacked arrangement.

Figure 4:
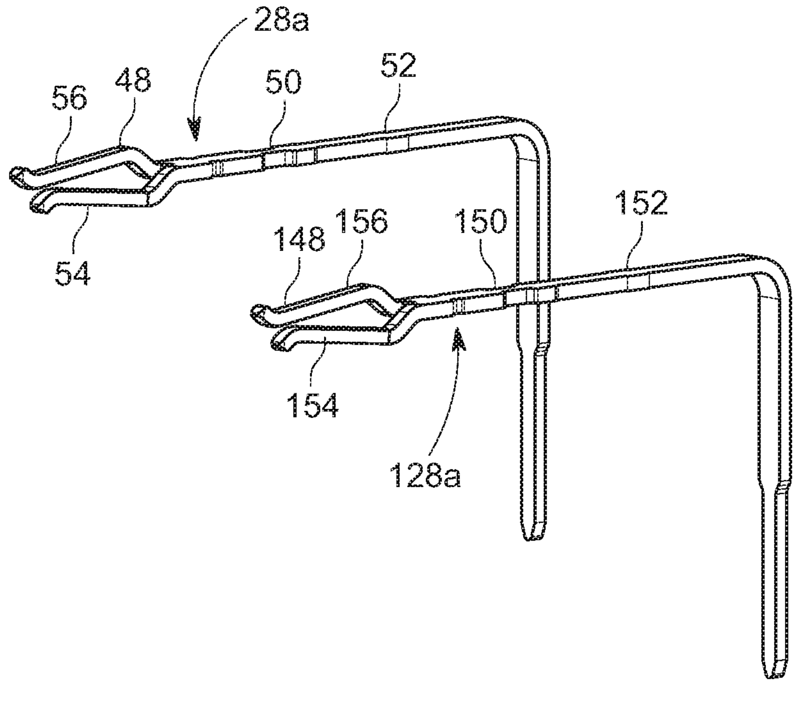
FIG. 4 depicts a rear perspective view of some of the terminals of the terminal module.
Figure 5:
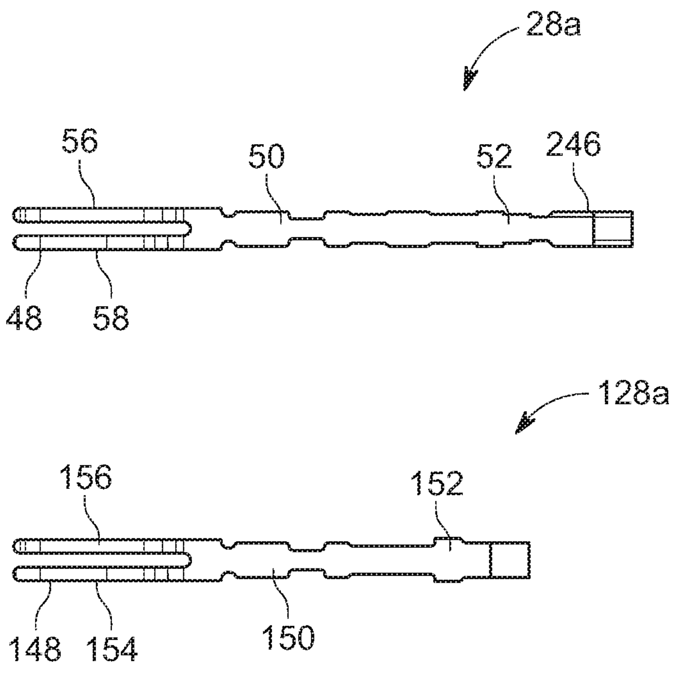
FIG. 5 depicts a top plan view of some of the terminals.
Figure 6:
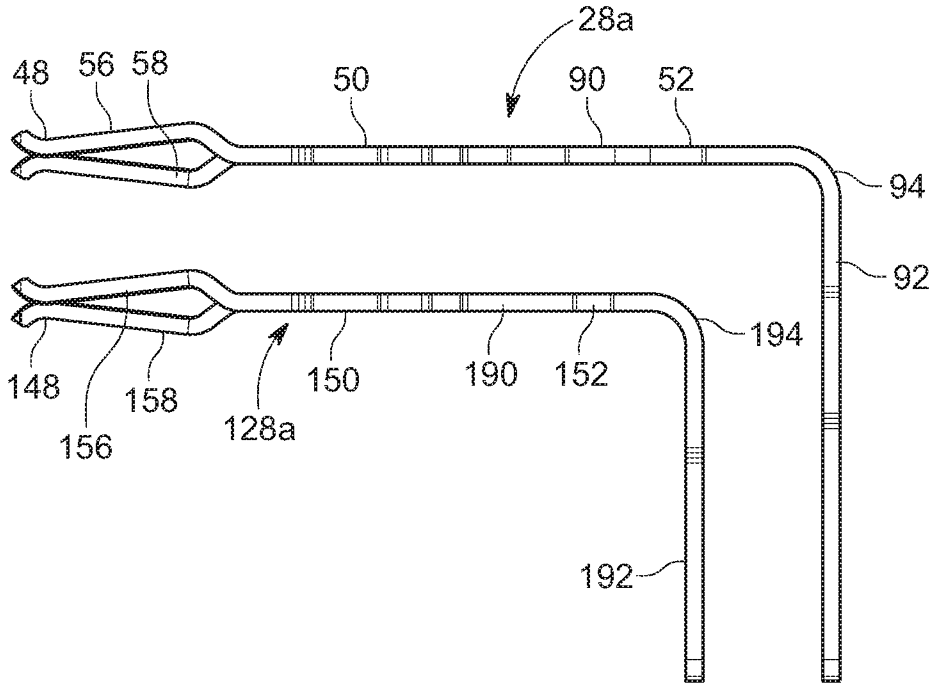
FIG. 6 depicts a side elevation view of some of the terminals.

As best shown in FIGS. 4-6, each signal terminal 28*a-f*, 128*a-f* sequentially includes a rear mating interface section 48, 148, an intermediate section 50, 150, and a front tail section 52, 152. The mating interface section 48, 148 is configured to be mechanically and electrically connected to the second connector (not shown). In the embodiment as shown, the mating interface section 48, 148 of each signal terminal 28*a-f*, 128*a-f* includes a pair of cantilevered beams 54, 56, 154, 156 which can be flexed away from each other to receive the second connector therebetween. The intermediate section 50, 152 of each signal terminal 28*a-f*, 128*a-f* is a flat horizontal member which extends from a rear end of the mating interface section 48, 148. The tail section 52, 152 of each signal terminal 28*a-f*, 128*a-f* is configured to engage with the component 30. If the component 30 is a circuit board as shown, the tail sections 52, 152 are mechanically and electrically connected thereto in a known manner, such as by soldering. In other embodiments, the tail sections 52, 152 are wire bonded to cables in a known manner. Other known structures for terminating the tail sections 52, 152 to components 30 are within the scope of the present disclosure.

Figure 8:
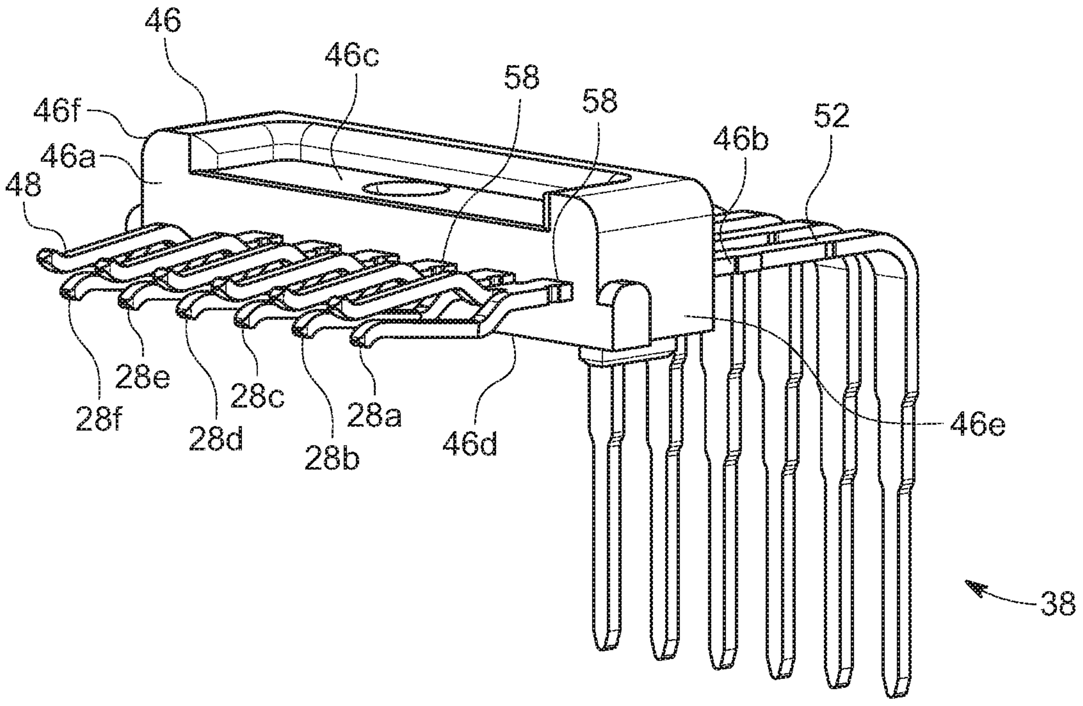
FIG. 8 depicts a rear perspective view of an upper terminal block of the terminal module.
Figure 9:
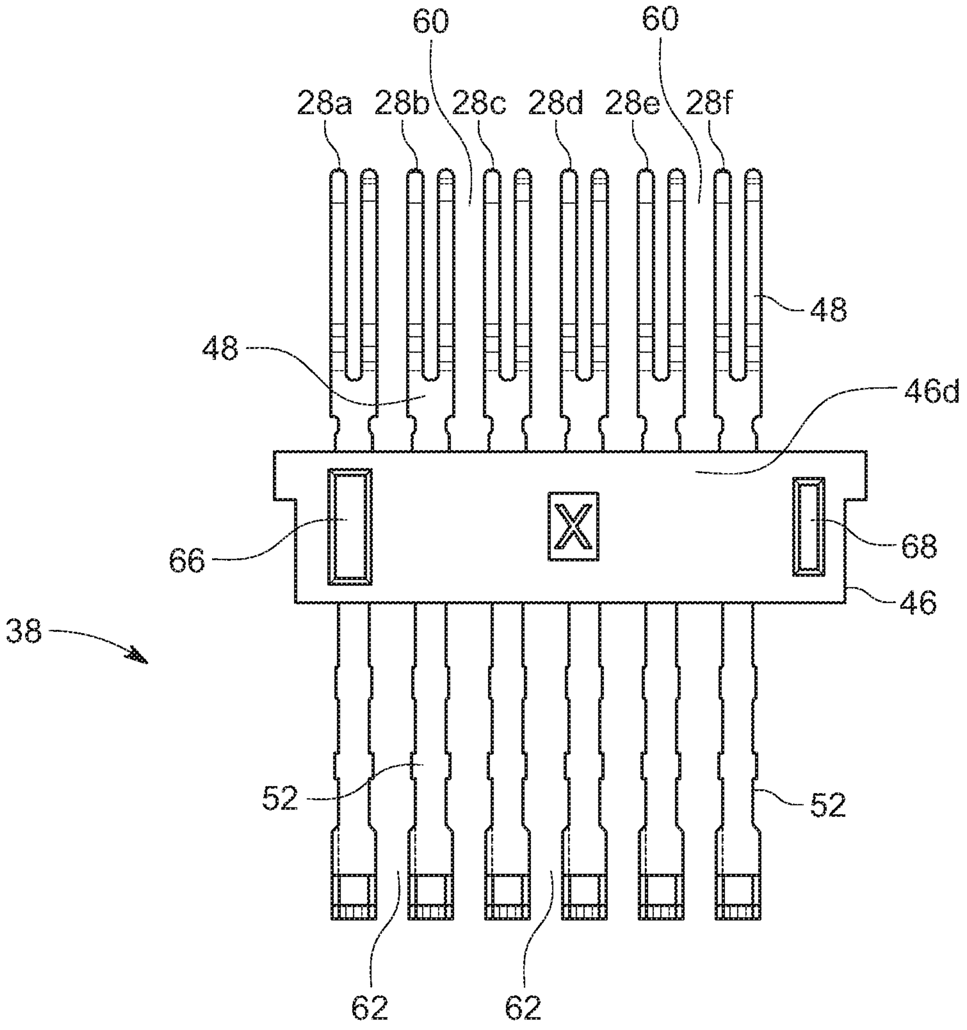
FIG. 9 depicts a bottom plan view of the upper terminal block.
Figure 10:
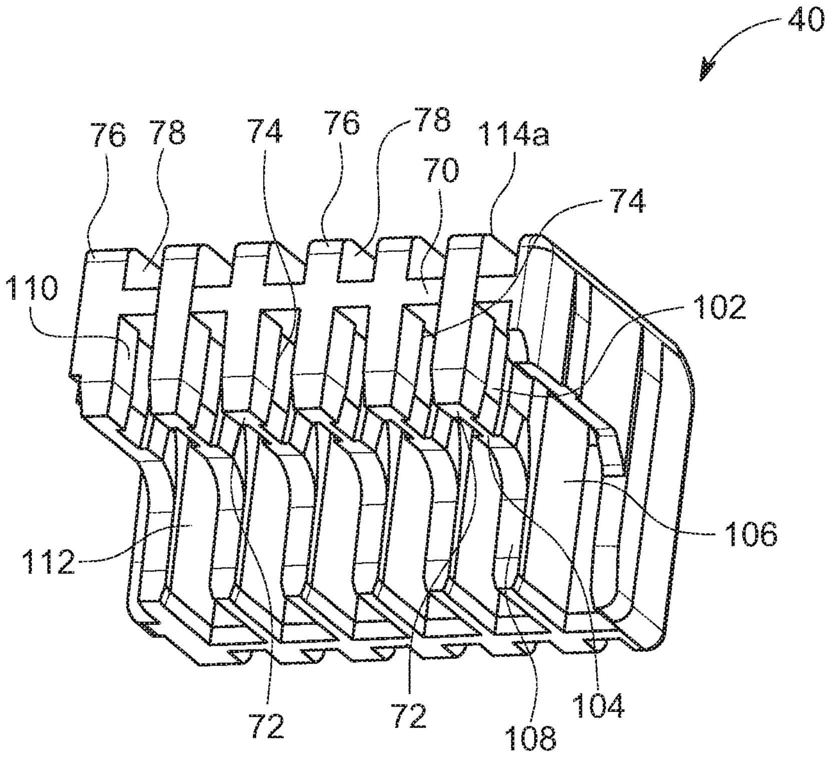
FIG. 10 depicts a rear perspective view of the upper insert.
Figure 11:
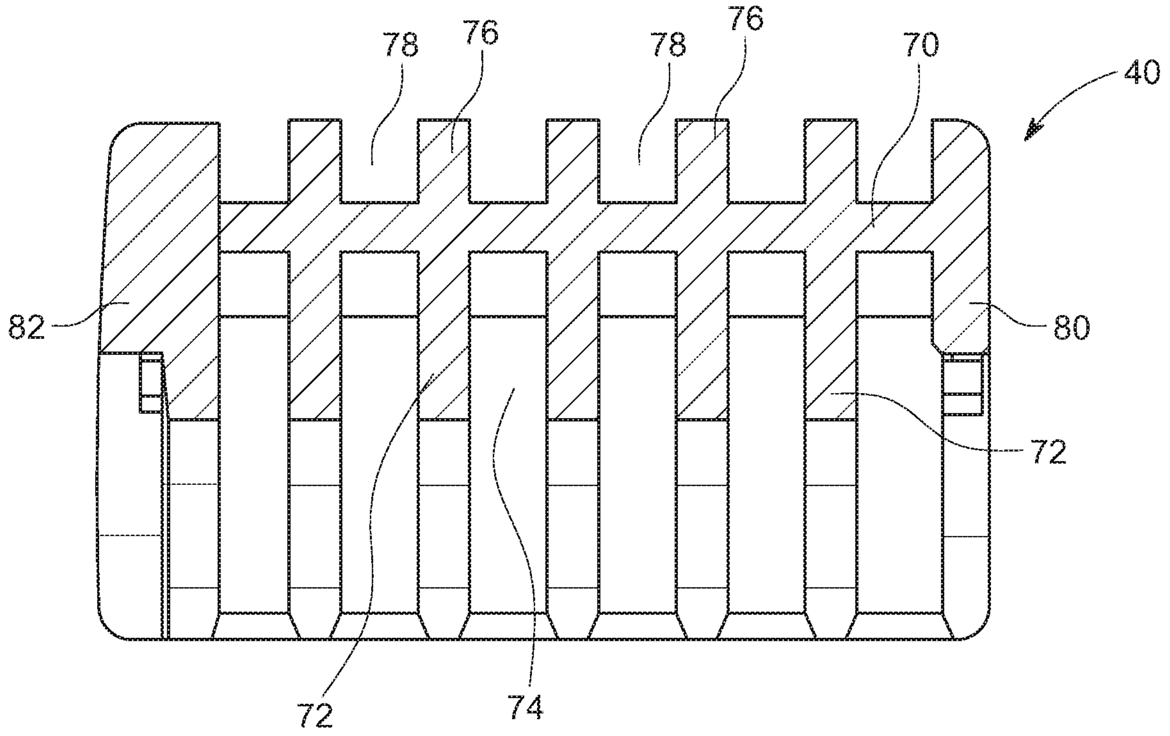
FIGS. 11 and 12 depict cross-sectional views of the upper insert.
Figure 12:
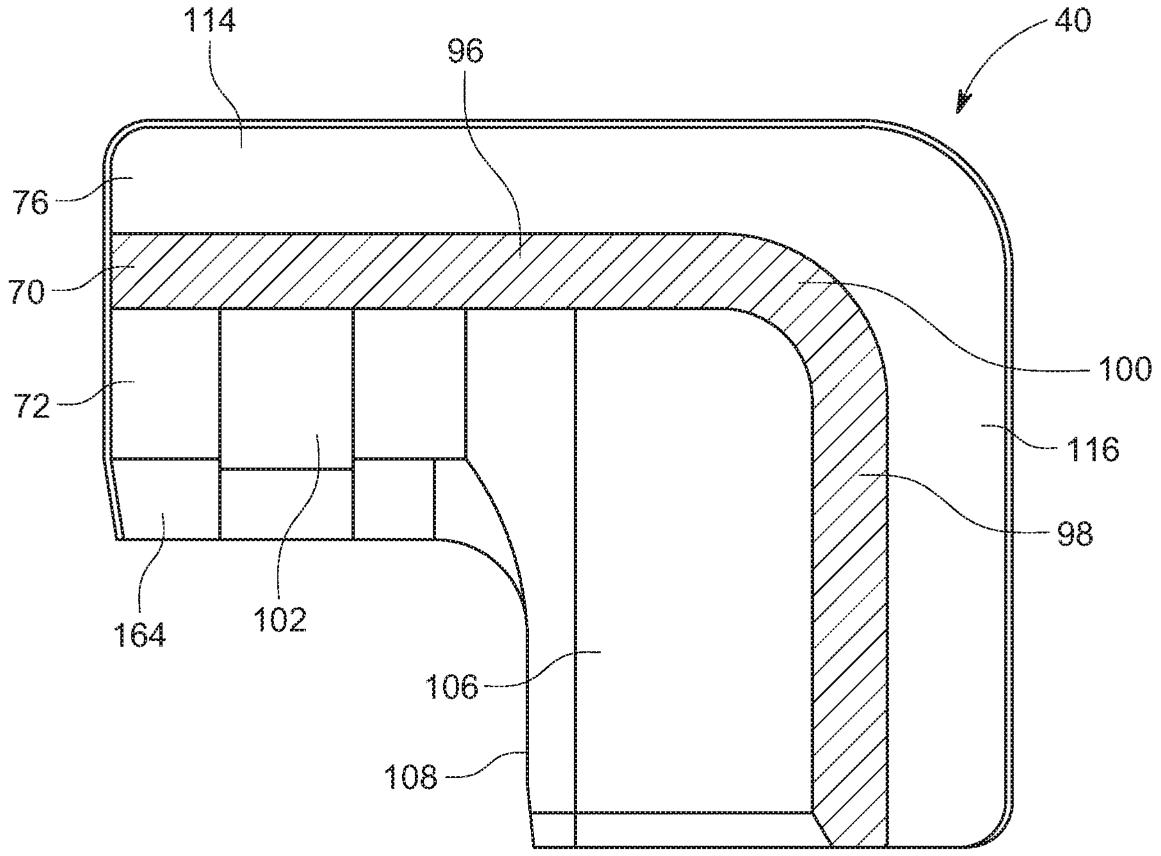
Figure 13:
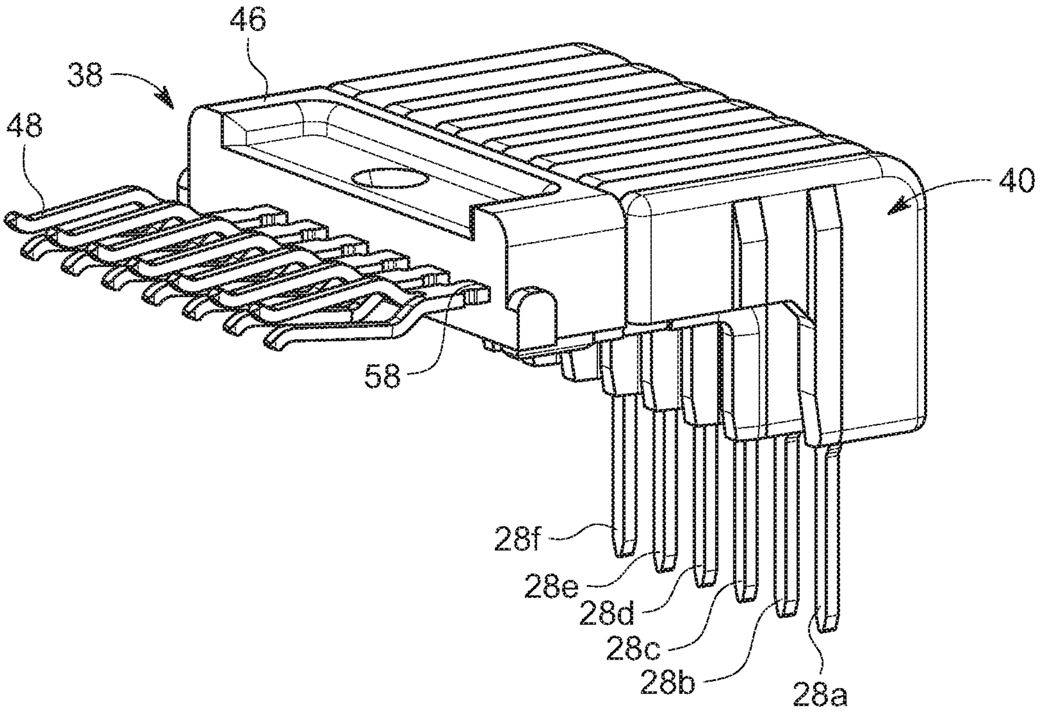
FIG. 13 depicts a rear perspective view of the upper terminal block and the upper insert.

The upper housing 46 has rear and front surfaces 46*a*, 46*b*, top, bottom and side surfaces 46*c*, 46*d*, 46*e*, 46*f* extending between the surfaces 46*a*, 46*b*, and a plurality of laterally spaced apart passageways 58 extending between the surfaces 46*a*, 46*b*, see FIG. 8. The passageways 58 form a row. The intermediate section 50 of each signal terminal 28*a-f* extend through one of the passageways 58, with the mating interface section 48 extending rearwardly from the rear surface 46*a*, and the tail section 52 extending forwardly from the front surface 46*b*, see FIGS. 8 and 9. As a result, rear spaces 60, FIG. 9, are defined between the mating interface sections 48 of the respective signal terminals 28*a-f*, and front spaces 62, FIG. 9, are defined between the tail sections 52 of the respective signal terminals 28*a-f*. In an embodiment, the upper housing 46 is formed by insert molding material around the intermediate sections 50 of the signal terminals 28*a-f*. A lead frame (not shown) may be formed on which the signal terminals 28*a-f* are stamped and formed and held together by a carrier (not shown). The housing 46 is then molded over or around the intermediate sections 50 of the signal terminals 28*a-f*. In another embodiment, the upper housing 46 may be separately formed and the signal terminals 28*a-f* are positioned through the passageways 58.

Figure 14:
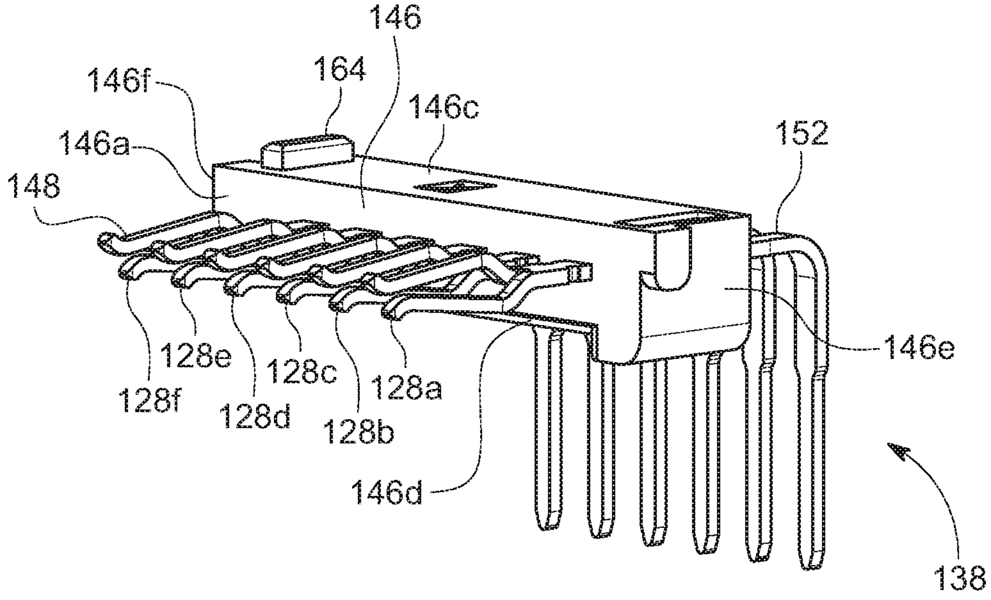
FIG. 14 depicts a rear perspective view of a lower terminal block of the terminal module.
Figure 15:
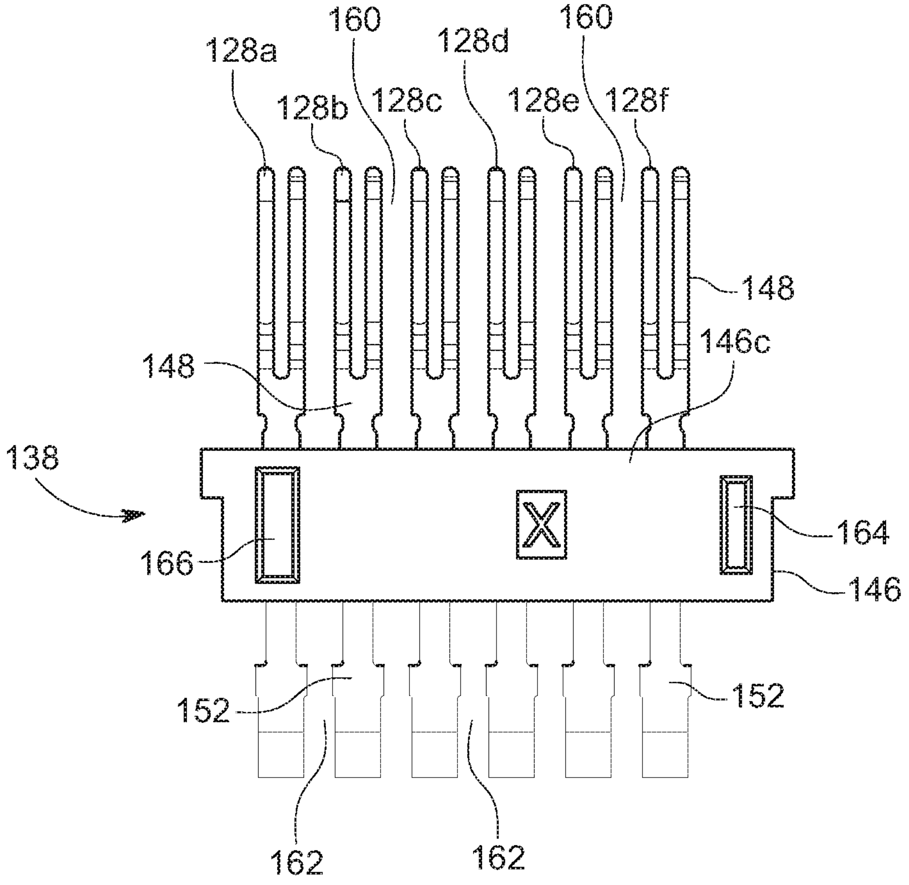
FIG. 15 depicts a top plan view of the lower terminal block.
Figure 16:
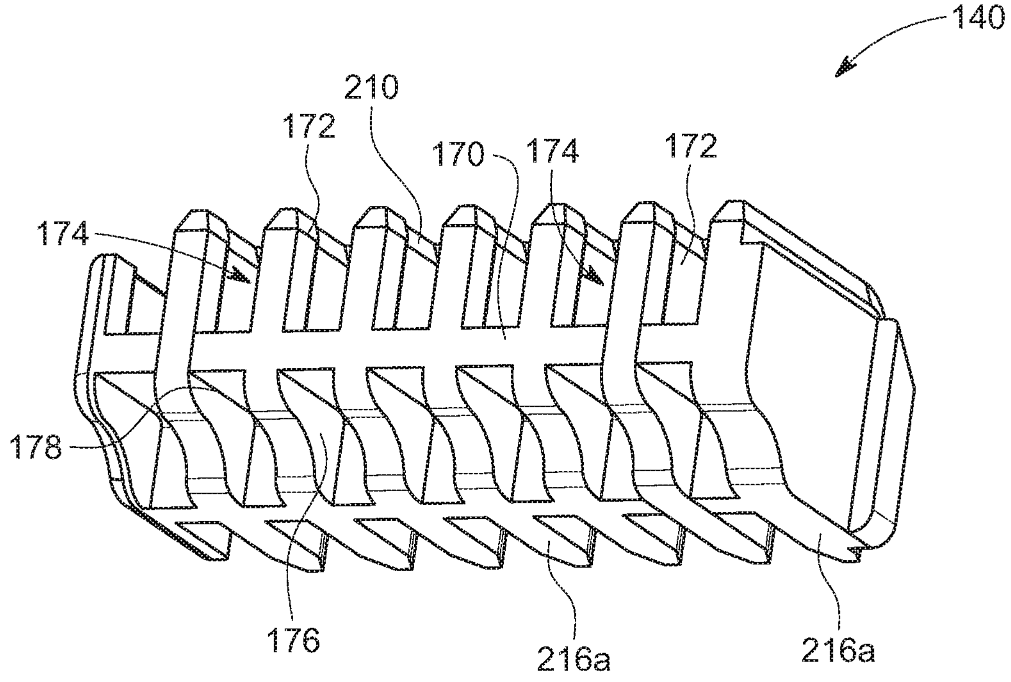
FIG. 16 depicts a rear perspective view of the lower insert.
Figure 17:
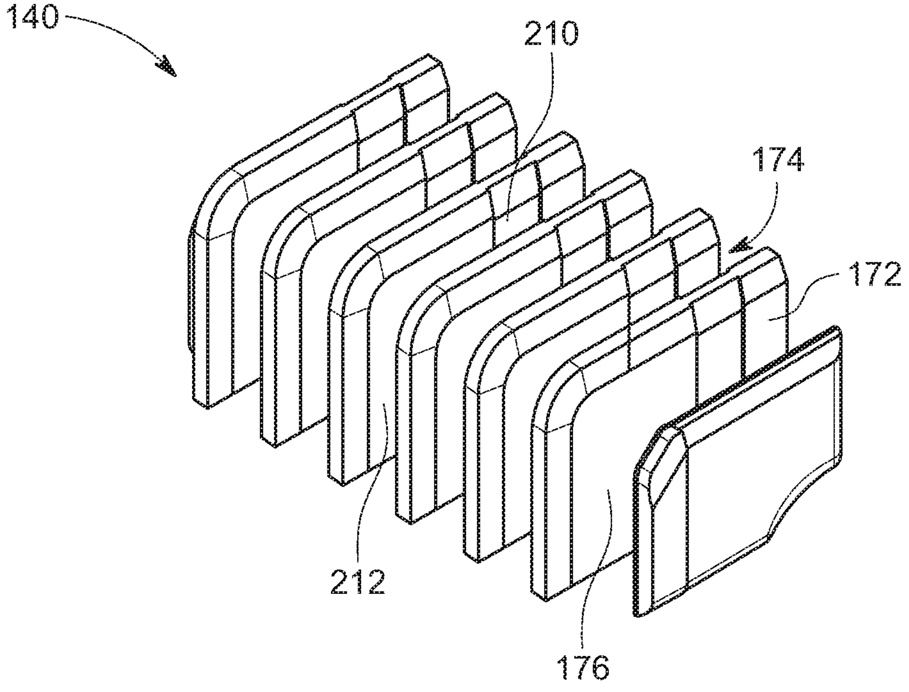
FIG. 17 depicts a front perspective view of the lower insert.
Figure 18:
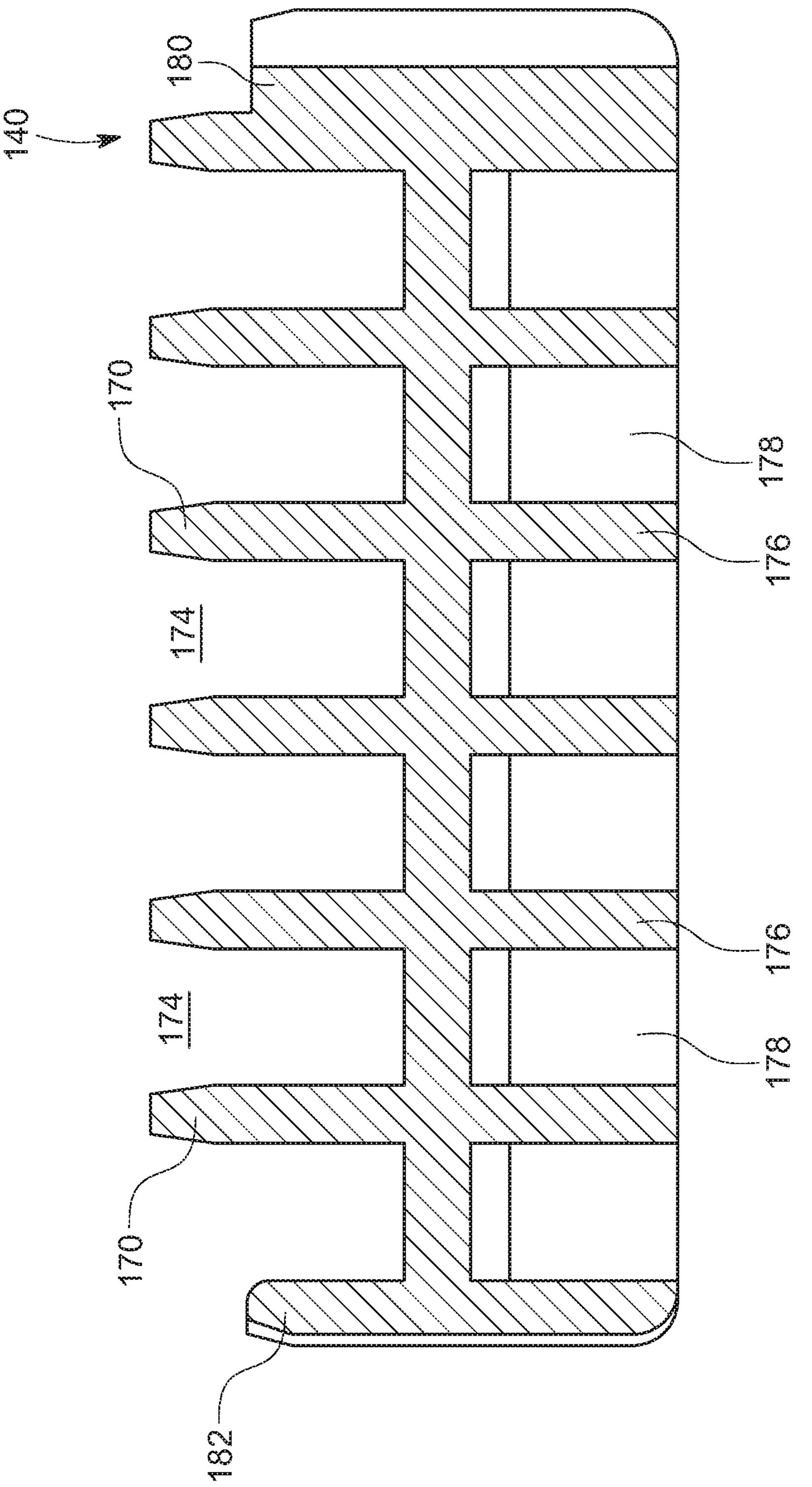
FIGS. 18 and 19 depict cross-sectional views of the lower insert.
Figure 19:
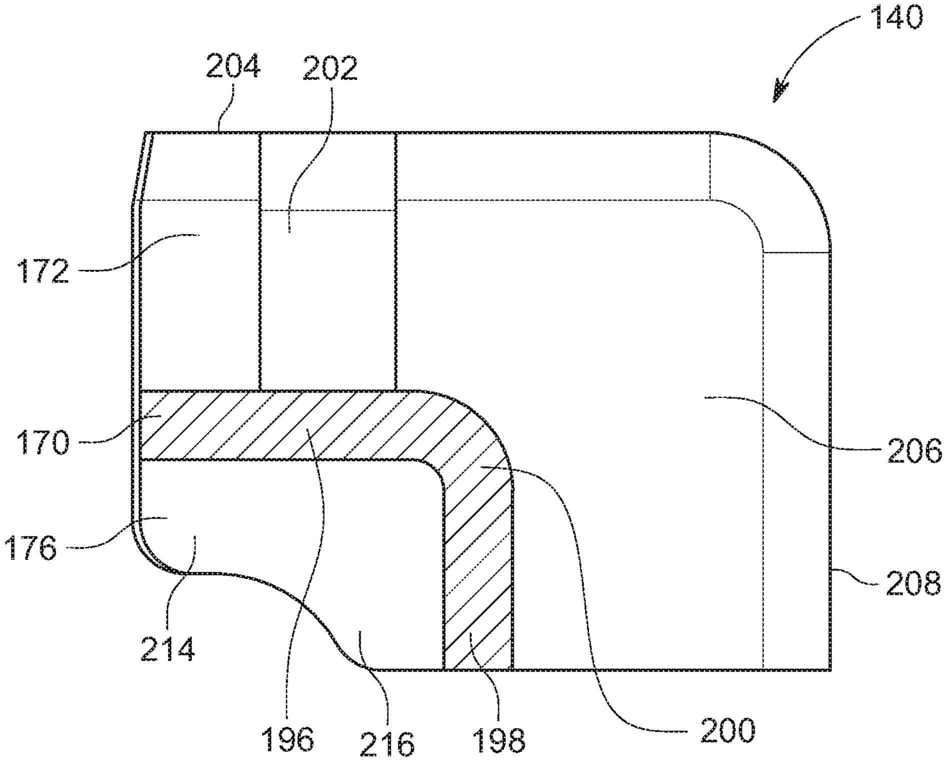
Figure 20:
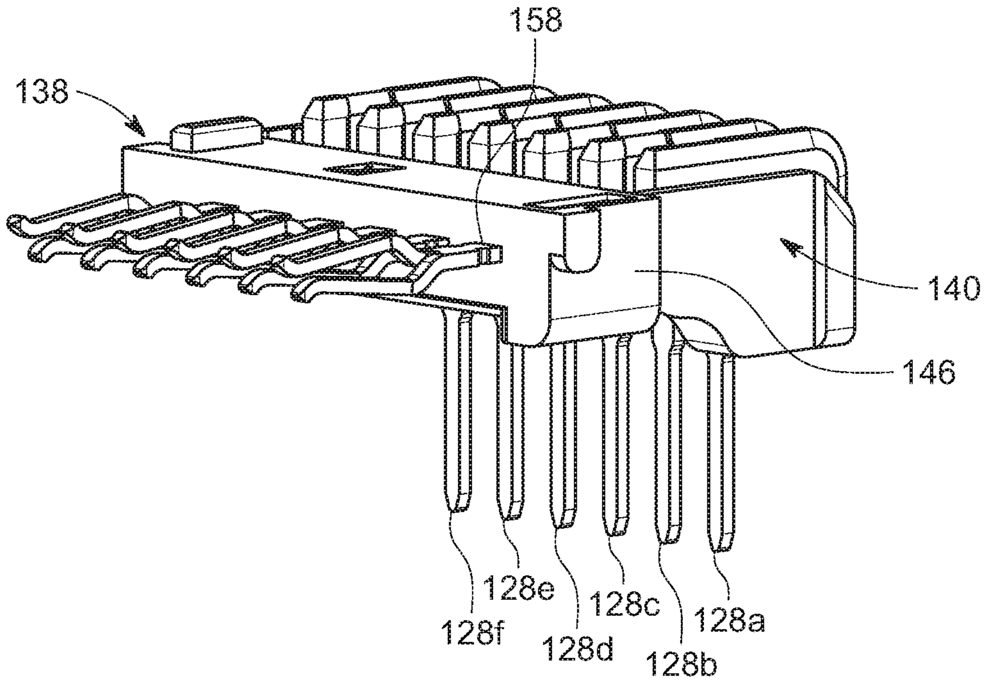
FIG. 20 depicts a rear perspective view of the lower terminal block and the lower insert.

The lower housing 146 has rear and front surfaces 146*a*, 146*b*, top, bottom and side surfaces 146*c*, 146*d*, 146*e*, 146*f* extending between the surfaces 146*a*, 146*b*, and a plurality of laterally spaced apart passageways 158 extending between the surfaces 146*a*, 146*b*, see FIG. 14. The passageways 158 form a row. The intermediate section 150 of each signal terminal 128*a-f* extend through one of the passageways 158, with the mating interface section 148 extending rearwardly from the rear surface 146*a*, and the tad section 152 extending forwardly from the front surface 146*b*, see FIGS. 14 and 15. As a result, rear spaces 160, see FIG. 15, are defined between the mating interface sections 148 of the respective signal terminals 128*a-f*, and front spaces 162, see FIG. 15, are defined between the tail sections 152 of the respective signal terminals 128*a-f*. In an embodiment, the lower housing 146 is formed by insert molding material around the intermediate sections 150 of the signal terminals 128*a-f*. A lead frame (not shown) may be formed on which the signal terminals 128*a-f* are stamped and formed and held together by a carrier (not shown). The housing 146 is then molded over or around the intermediate sections 150 of the signal terminals 128*a-f*. In another embodiment, the lower housing 146 may be separately formed and the signal terminals 128*a-f* are positioned through the passageways 158.

The signal terminals 28*a-f*, 128*a-f* are arranged in differential pairs within each row in the housings 46, 146. In the upper terminal block 38, signal terminals 28*a*, 28*b* form a first differential pair which are side-by-side in the row, signal terminals 28*c*, 28*d* form a second differential pair which are side-by-side in the row, and signal terminals 28*e*, 28*f* form a third differential pair which are side-by-side in the row. In the lower terminal block 138, signal terminals 128*a*, 128*b* form a first differential pair which are side-by-side in the row, signal terminals 128*c*, 128*d* form a second differential pair which are side-by-side in the row, and signal terminals 128*e*, 128*f* form a third differential pair which are side-by-side in the row. While three differential pairs are shown in each of the terminal blocks 38, 138, more or fewer differential pairs may be provided. Each signal terminal 28*a-f*, 128*a-f* includes a specific spacing within the housing 46, 146 and geometry, including but not limited to varying cross-sections, cut-outs, radii and spacing gaps. Each geometrical configuration and position of the signal terminal 28*a-f*, 128*a-f* is specifically arranged within the respective housing 46, 146 to optimize the signal integrity (SI) performance of each differential signal pair. Examples of optimized SI tuning includes adjusting the spacing between the mating interface sections 148 of the signal terminals 28*a-f*, 128*a-f* to increase impedance. Notches may be formed along the signal terminals 28*a-f*, 128*a-f* to match impedance and create a balanced signal transmission. Further, the housings 46, 146 may also be specifically formed to tune the SI performance of each terminal block 38, 138. For example, the housings 46, 146 may include cross-holes and apertures that interact with the specific geometry of each signal terminal 28*a-f*, 128*a-f* or terminal pair to affect the optimized SI performance. Accordingly, portions of each signal terminal 28*a-f*, 128*a-f* may be exposed to air or totally enclosed by the insulative material of the housing 46, 146 with additional adjustments to material thickness by either increasing or decreasing the insulative material in specific areas or regions. The dielectric constants of the insulative housings 46, 146 and air are strategically employed to further enhance the SI performance of the signal terminals 28*a-f*, 128*a-f*.

Figure 7:
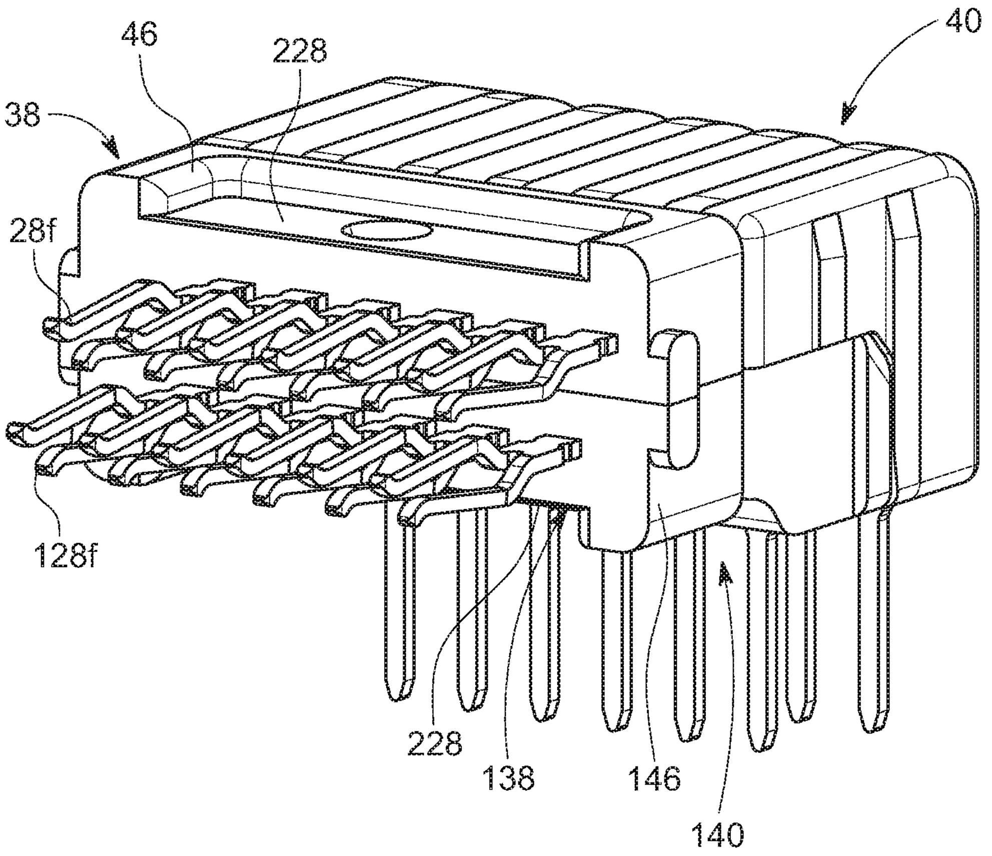
FIG. 7 depicts a rear perspective view of the terminal module having upper and lower inserts mounted thereon.

As shown in FIG. 7. The upper terminal block 38 is stacked on top of the lower terminal block 138 to form the stacked arrangement. The bottom surface 46*d* of the upper housing 46 sits on the top surface 146*c* of the lower housing 146. The mating interface sections 48, 148 extend rearwardly from the housings 46, 146 such that an upper row of mating interface sections 48 is formed by the upper terminal block 38 and a lower row of mating interface sections 148 is formed by the lower terminal block 138, and the tail sections 52, 152 extend forwardly from the housings 46. 146 such that an upper row of tail sections 52 is formed is formed by the upper terminal block 38 and a lower row of tail sections 152 is formed is formed by the lower terminal block 138. The upper and lower housings 46, 146 may include interengagements for coupling the housings 46, 146 together. For example and as shown in FIGS. 9 and 15, the lower housing 146 includes a projection 164 extending from the top surface 146*c* thereof which engages with an opening 66 on the bottom surface 46*d* of the upper housing 46, and includes an opening 166 in the top surface 146*c* thereof which engages with a projection 68 extending from the bottom surface 46*d* of the upper housing 46. This ensures the correct orientation of the housings 46, 146 relative to each other, and thus the terminal blocks 38, 138, while interlocking the housings 46, 146 together.

The upper insert 40 is operatively coupled to the terminal blocks 38, 138 as described herein. The upper insert 40 is formed of a plastic material having dielectric constant (Dk) greater than 1 (air/vacuum). In a preferred embodiment, the dielectric constant of the plastic material of the upper insert 40 (dielectric constant, relative permittivity) is greater than 4.5. In an embodiment, the upper insert 40 is formed of a plastic resin having a glass content of 15%-30%. The upper insert 40 includes a base 70 and a plurality of spaced apart teeth 72 extending from a first side thereof which define a plurality of spaced apart channels 74. In an embodiment, a plurality of spaced apart fins 76 extend from the opposite side of the base 70 which define a plurality of spaced apart channels 78. The outermost teeth form end walls 80, 82.

The lower insert 140 is operatively coupled to the terminal blocks 38, 138 as described herein. The lower insert 140 is formed of a plastic material having dielectric constant (Dk) greater than 1 (air/vacuum). In a preferred embodiment, the dielectric constant of the plastic material of the lower insert 140 (dielectric constant, relative permittivity) is greater than 4.5. In an embodiment, the lower insert 140 is formed of a plastic resin having a glass content of 15%-30%. The lower insert 140 includes a base 170 and a plurality of spaced apart teeth 172 extending a first side thereof which define a plurality of spaced apart channels 174. In an embodiment, a plurality of spaced apart fins 176 extend from the opposite side of the base 170 which define a plurality of spaced apart channels 178. The outermost teeth form end walls 180, 182.

Figure 21:
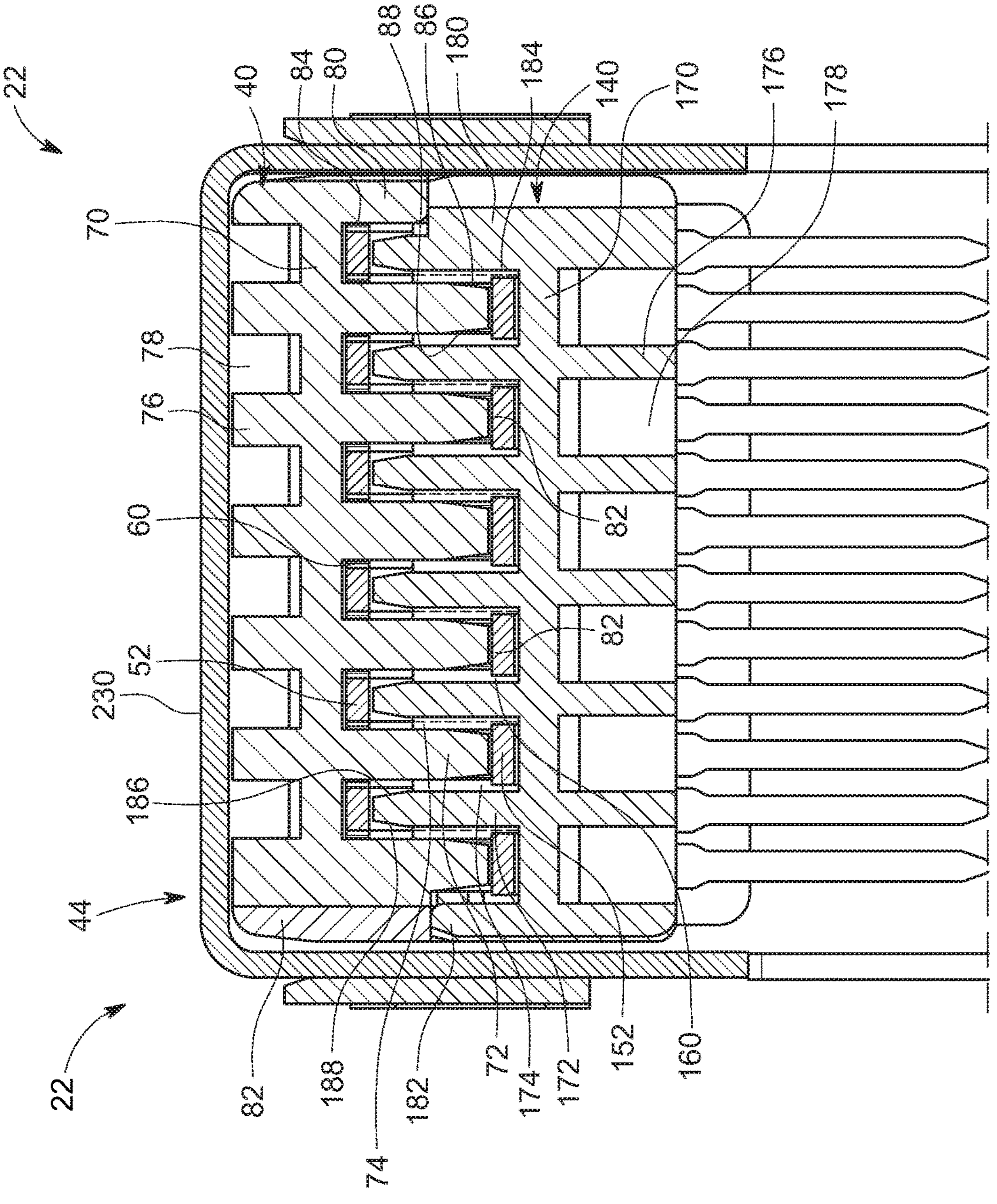
FIG. 21 depicts a partial cross-sectional view of the terminal module.
Figure 22:
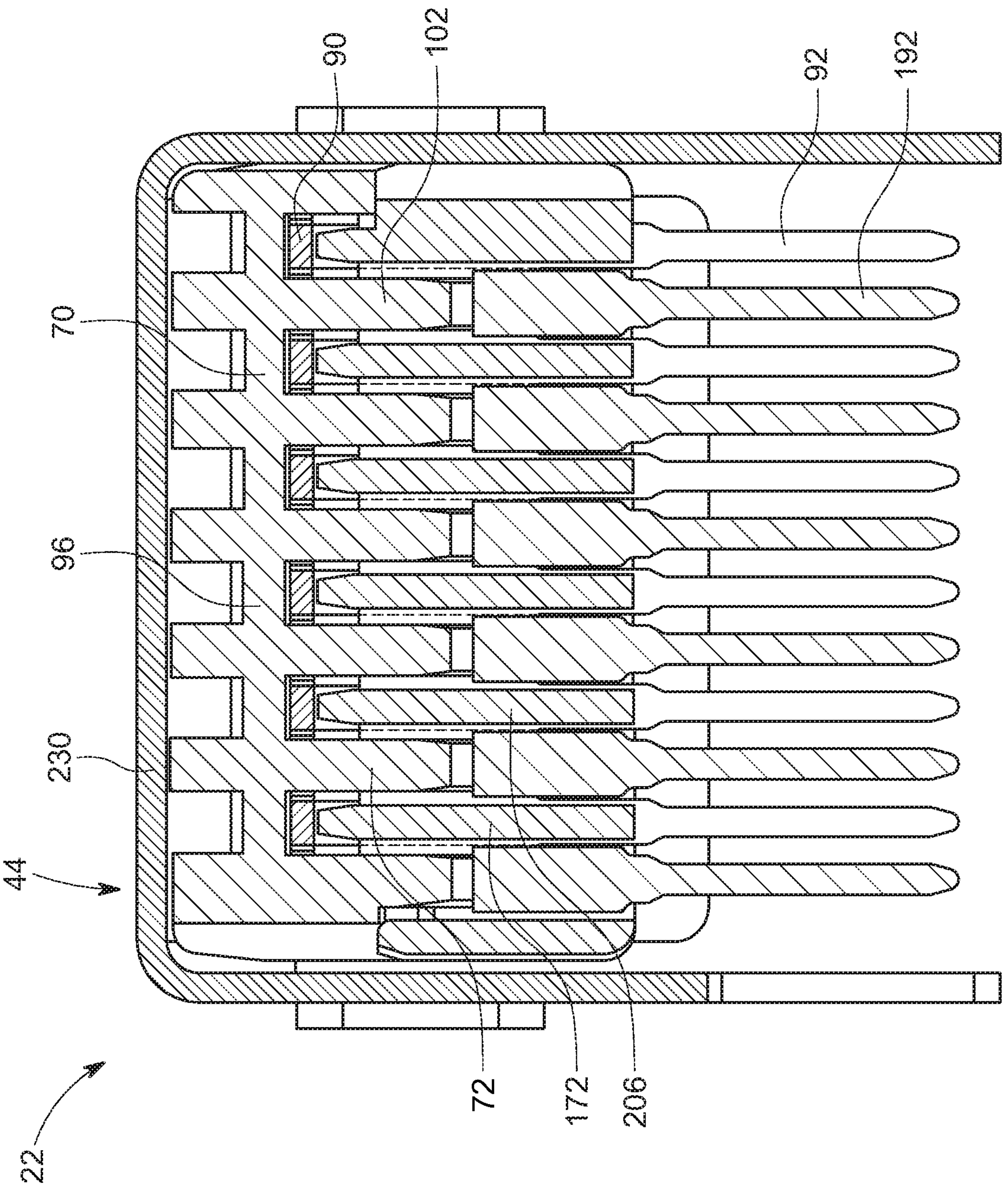
FIGS. 22-25 depict cross-sectional views of the terminal module.
Figure 23:
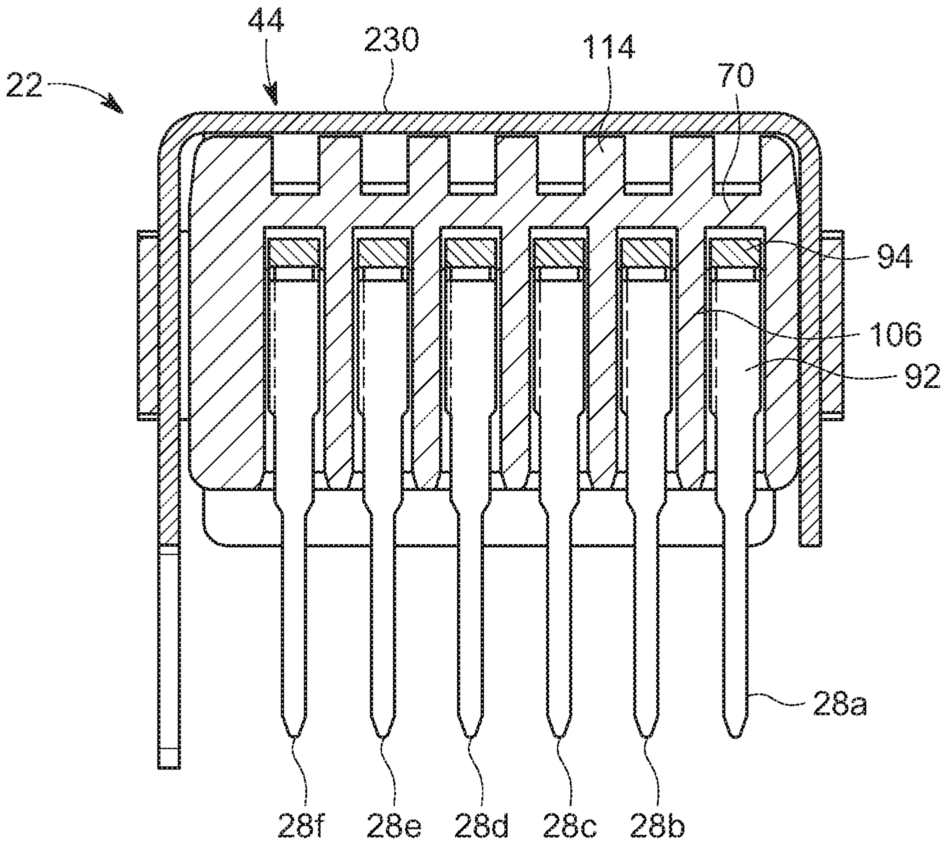
Figure 24:
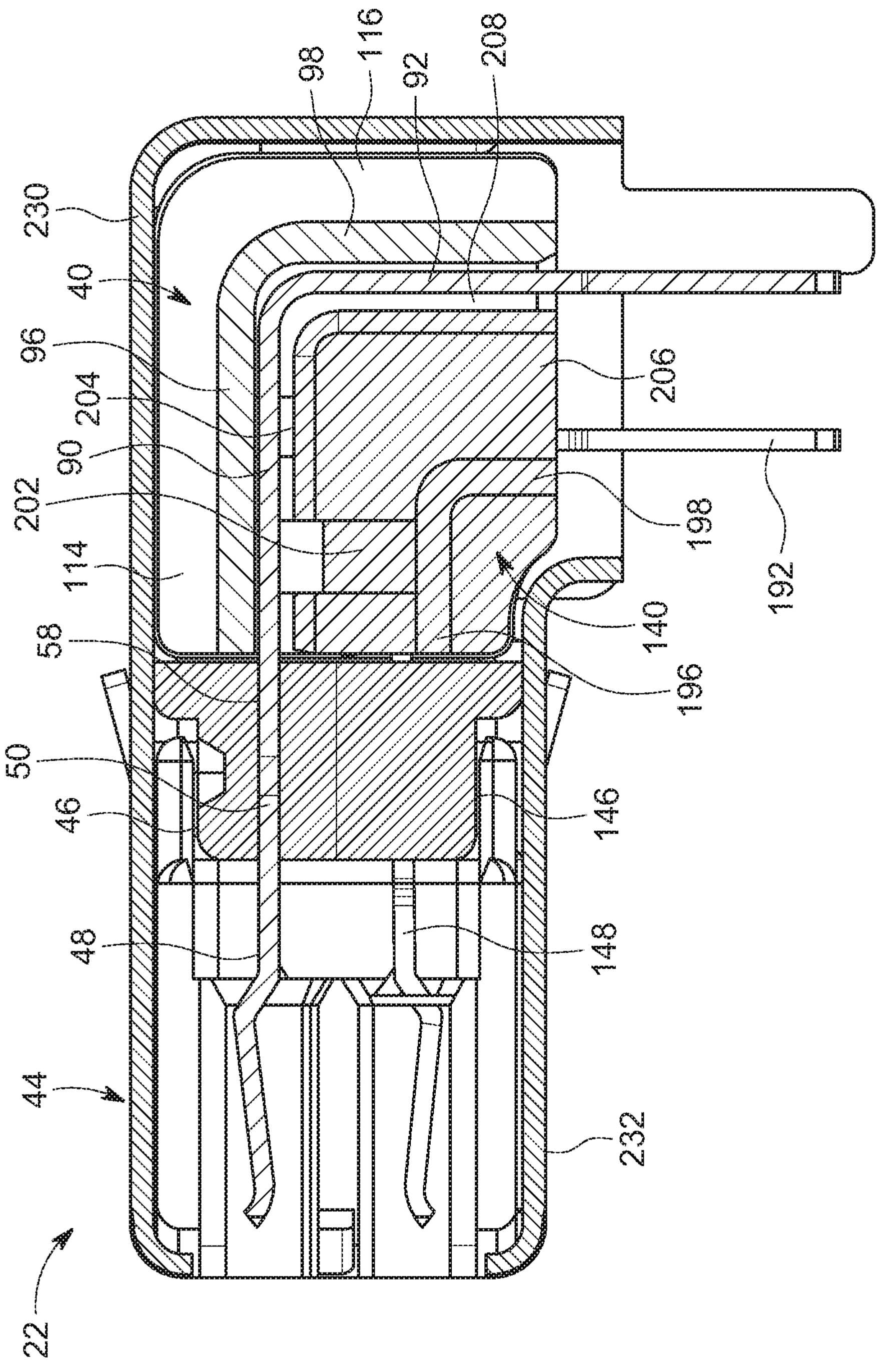
Figure 25:
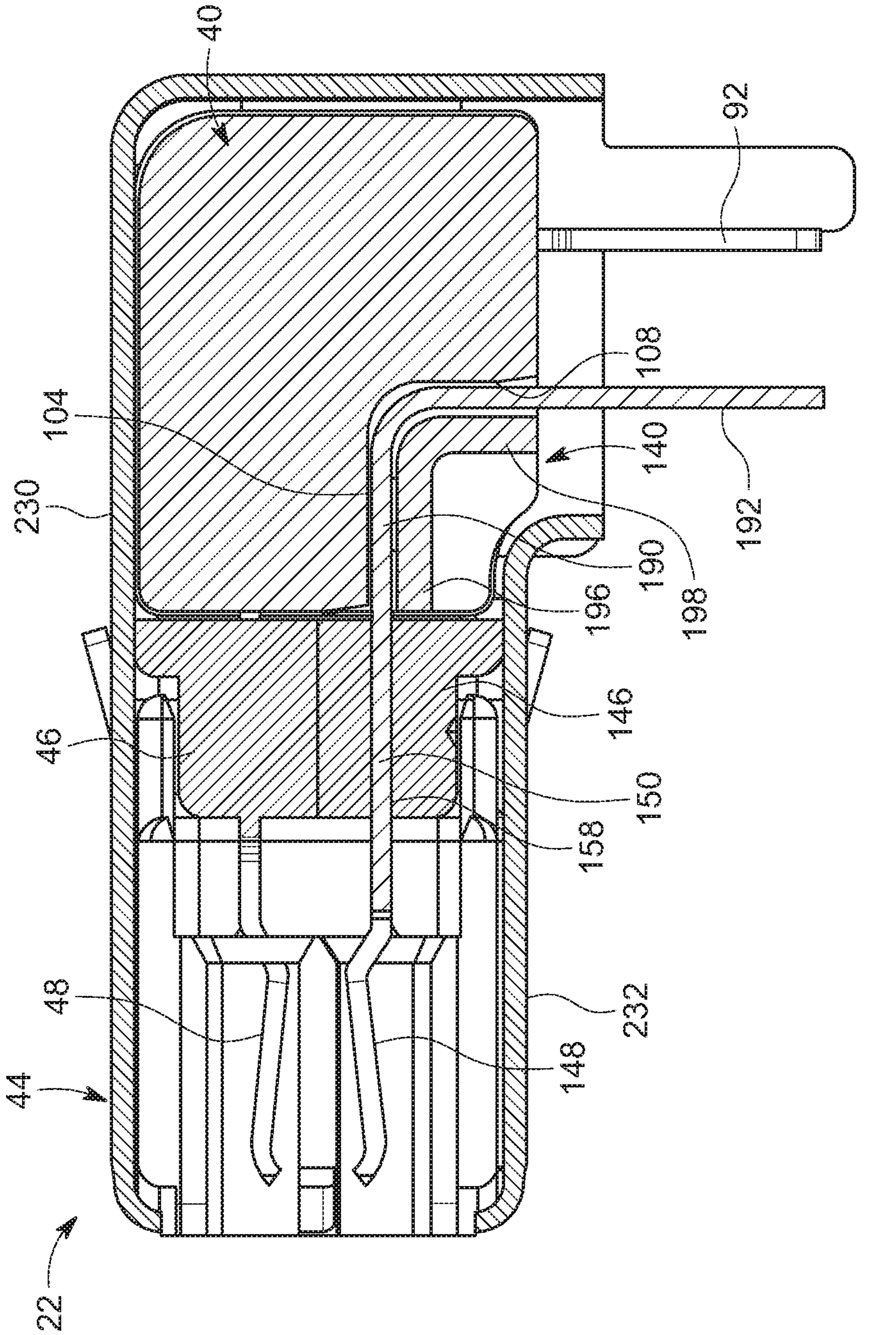

The upper and lower inserts 40, 140 are attached to the tail sections 52, 152 of the signal terminals 28*a-f*, 128*a-f*. The teeth 72 of the upper insert 40 pass through the spaces 62 between the tail sections 52 of the signal terminals 28*a-f* of the upper terminal block 38 and seat within the channels 174 of the lower insert 140. The teeth 172 of the lower insert 140 pass through the spaces 162 between the tail sections 152 of the signal terminals 128*a-f* of the lower terminal block 138 and seat within the channels 74 of the upper insert 40. As shown in FIG. 21, the teeth 72 of the upper insert 40 are laterally offset from the teeth 172 of the lower insert 140. Ends 182 of the teeth 172 of the lower insert 140 face the tail sections 52 of the signal terminals 28*a-f* and the tail sections 52 of the signal terminals 28*a-f* are positioned between the ends 182 of the teeth 172 of the lower insert 140 and the base 70 of the upper insert 40. This forms an upper row of laterally spaced apart passageways 84, see FIG. 21, between the base 70, the teeth 72 and the teeth 172. The passageways 84 may be larger than the tail sections 152 such that an air gap is provided around the tail section 152 in each passageway 84. Ends 82 of the teeth 72 of the upper insert 40 face the tail sections 152 of the signal terminals 128*a-f* and the tail sections 152 of the signal terminals 128*a-f* are positioned between the ends 82 of the teeth 72 of the upper insert 40 and the base 170 of the lower insert 140. This forms a lower row of passageways 184, see FIG. 21, between the base 170, the teeth 172 and the teeth 72. The passageways 184 may be larger than the tail sections 52 such that an air gap is provided around the tail section 52 in each passageway 184. In effect, the teeth 72, 172 form an interengaging comb structure.

In an embodiment and as best shown in FIG. 21, portions 86, 88 of the side walls of the teeth 72 extending from the end 82 are tapered to provide lead-in surfaces for the teeth 72 to easily enter into the channels 174 with the remainder of the sides walls of the teeth 72 being straight, and portions 186, 188 of the side walls of the teeth 172 extending from the end 182 are tapered to provide lead-in surfaces for the teeth 172 to easily enter into the channels 74 with the remainder of the sides walls of the teeth 72 being straight. Alternatively, the remainder of the side walls may have features which enable the teeth 72 to engage with the teeth 172 to prevent relative movement between the teeth 72, 172. Ends of the end walls 80, 180 may abut against each other, and ends of the end walls 82, 182 may abut against each other to ensure proper spacing between the teeth 72 and the base 170 for the tail sections 52, and between the teeth 172 and the base 70 for the tail sections 152. As a result, the tail sections 52, 152 are separated from each other by the mated inserts 40, 140. The mated inserts 40, 140 provide for decreased impedance between the differential signal pairs of the signal terminals 28*a-f*, 128*a-f*, and further tune the SI performance of each differential signal pair of signal terminals 28*a-f*, 128*a-f*. Thus the depicted design allows for tuning of the impedance of the terminals while ensuring the overall dielectric constant is kept low due to the significant use of air.

In an embodiment and as shown in the drawings, each signal terminal 28*a-f*, 128*a-f* is a right-angle terminal such that each tail section 52, 152 has a horizontal portion 90, 190 and a vertical portion 92, 192 joined together at a 90-degree bend 94, 194, see FIG. 6. In this embodiment, the horizontal portions 90 of the upper terminals 28*a-f* are longer than the horizontal portions 190 of the lower terminals 128*a-f*, and the vertical portions 92 of the upper terminals 28*a-f* are longer than the vertical portions 192 of the lower terminals 128*a-f*. With this embodiment, the base 70 of the upper insert 40 is L-shaped with a horizontal portion 96 and a vertical portion 98 joined together at a bend 100, and each tooth 72 is L-shaped with a horizontal portion 102 extending from the horizontal portion 96 of the base 70 and ending at an end 104, and a vertical portion 106 extending from the vertical portion 98 of the base 70 and ending at an end 108. The ends 104, 108 thus form an L-shape. This forms a horizontal portion 110 of the channel 74 and a vertical portion 112 of the channel 74. The fins 76 can likewise be L-shaped and have a horizontal portion 114 extending from the horizontal portion 96 of the base 70 and a vertical portion 116 extending from the vertical portion 98 of the base 70. Further with this embodiment, the base 170 of the lower insert 140 is L-shaped with a horizontal portion 196 and a vertical portion 198 joined together at a bend 200, and each tooth 172 is L-shaped with a horizontal portion 202 extending from the horizontal portion 196 of the base 170 and ending at an end 204, and a vertical portion 206 extending from the vertical portion 198 of the base 170 and ending at an end 208. The ends 204, 208 thus form an L-shape. This forms a horizontal portion 210 of the channel 174 and a vertical portion 212 of the channel 174. The fins 176 can likewise be L-shaped and have a horizontal portion 214 extending from the horizontal portion 196 of the base 170 and a vertical portion 216 extending from the vertical portion 198 of the base 170.

With the right-angle embodiment, the upper and lower inserts 40, 140 are attached to the tail sections 52, 152 of the signal terminals 28*a-f*, 128*a-f*. The horizontal portions 102 of the teeth 72 of the upper insert 40 pass between the horizontal portions 90 of the tail sections 52 of the signal terminals 28*a-f* of the upper terminal block 38 and seat within the horizontal portions 210 of the channels 174 of the lower insert 140. The vertical portions 106 of the teeth 72 of the upper insert 40 pass between the vertical portions 92 of the tail sections 52 of the signal terminals 28*a-f* of the upper terminal block 38 and seat within the vertical portions 212 of the channels 174 of the lower insert 140. The horizontal portions 202 of the teeth 172 of the lower insert 140 pass between the horizontal portions 190 of the tail sections 152 of the signal terminals 128*a-f* of the lower terminal block 138 and seat within the horizontal portions 110 of the channels 74 of the upper insert 40. The vertical portions 206 of the teeth 172 of the lower insert 140 pass between the vertical portions 192 of the tail sections 152 of the signal terminals 128*a-f* of the lower terminal block 138 and seat within the vertical portions 112 of the channels 74 of the upper insert 40. As such, the horizontal portion 96 of the base 70 is above the horizontal portion 196 of the base 170 and the vertical portion 98 of the base 70 is forward of the vertical portion 198 of the base 170

The ends 204, 208 of the teeth 172 of the lower insert 140 face the horizontal and vertical portions 90, 92 of the tail sections 52 of the signal terminals 28*a-f* and the horizontal and vertical portions 90, 92 of the tail sections 52 of the signal terminals 28*a-f* are positioned between the ends 204, 208 of the teeth 172 of the lower insert 140 and the base 70 of the upper insert 40. This forms horizontal and vertical portions of the upper row of passageways 84 which may be larger than the horizontal and vertical portions 190, 192 of the tail sections 152 such that an air gap is provided. The ends 104, 108 of the teeth 72 of the upper insert 40 face the horizontal and vertical portions 190, 192 of the tail sections 152 of the signal terminals 128*a-f* and the horizontal and vertical portions 190, 192 of the tail sections 152 of the signal terminals 128*a-f* are positioned between the ends 104, 108 of the teeth 72 of the upper insert 40 and the base 170 of the lower insert 140. This forms horizontal and vertical portions of the passageways 184 which may be larger than the horizontal and vertical portions 90, 92 of the tail sections 52 such that an air gap is provided. In an embodiment, side walls of the horizontal and vertical portions 102, 106 of the teeth 72 extending from the ends 104, 108 are tapered to provide lead-in surfaces for the teeth 72 to easily enter into the horizontal and vertical portions 210, 212 of the channels 174, and side walls of the horizontal and vertical portions 202, 206 of the teeth 172 extending from the ends 204, 208 are tapered to provide lead-in surfaces for the teeth 172 to easily enter into the horizontal and vertical portions 110, 112 of the channels 74. In effect, the teeth 72, 172 form an interengaging comb structure. As a result, the tail sections 52, 152 are separated from each other by the mated inserts 40, 140. The mated inserts 40, 140 provide for decreased impedance between the differential signal pairs of the signal terminals 28*a-f*, 128*a-f*, and further tune the SI performance of each differential signal pair of signal terminals 28*a-f*, 128*a-f* versus only providing air gaps between the tail portions 52, 152.

While each tail section 52, 152 is shown as L-shaped in the drawings, it is to be understood that each tail section 52, 152 can be straight. In such an embodiment the connector would be configured for vertical engagement instead of the depicted right angle engagement but otherwise the internal design can be substantially the same.

In an embodiment, the space between the signal terminals 28*a-f*, 128*a-f* and the inserts 40, 140 is filled with curable adhesive (such as an ultra violet curable adhesive) to remove all air gaps which, in certain embodiments may be useful to tune the overall performance of the connector system because of the evacuation of nearly all air and the curable adhesive being in close contact with the signal terminals 28*a-f*, 128*a-f*.

In an embodiment, the inserts 40, 140 have locking features which lock the inserts 40, 140 together.

Figure 3:
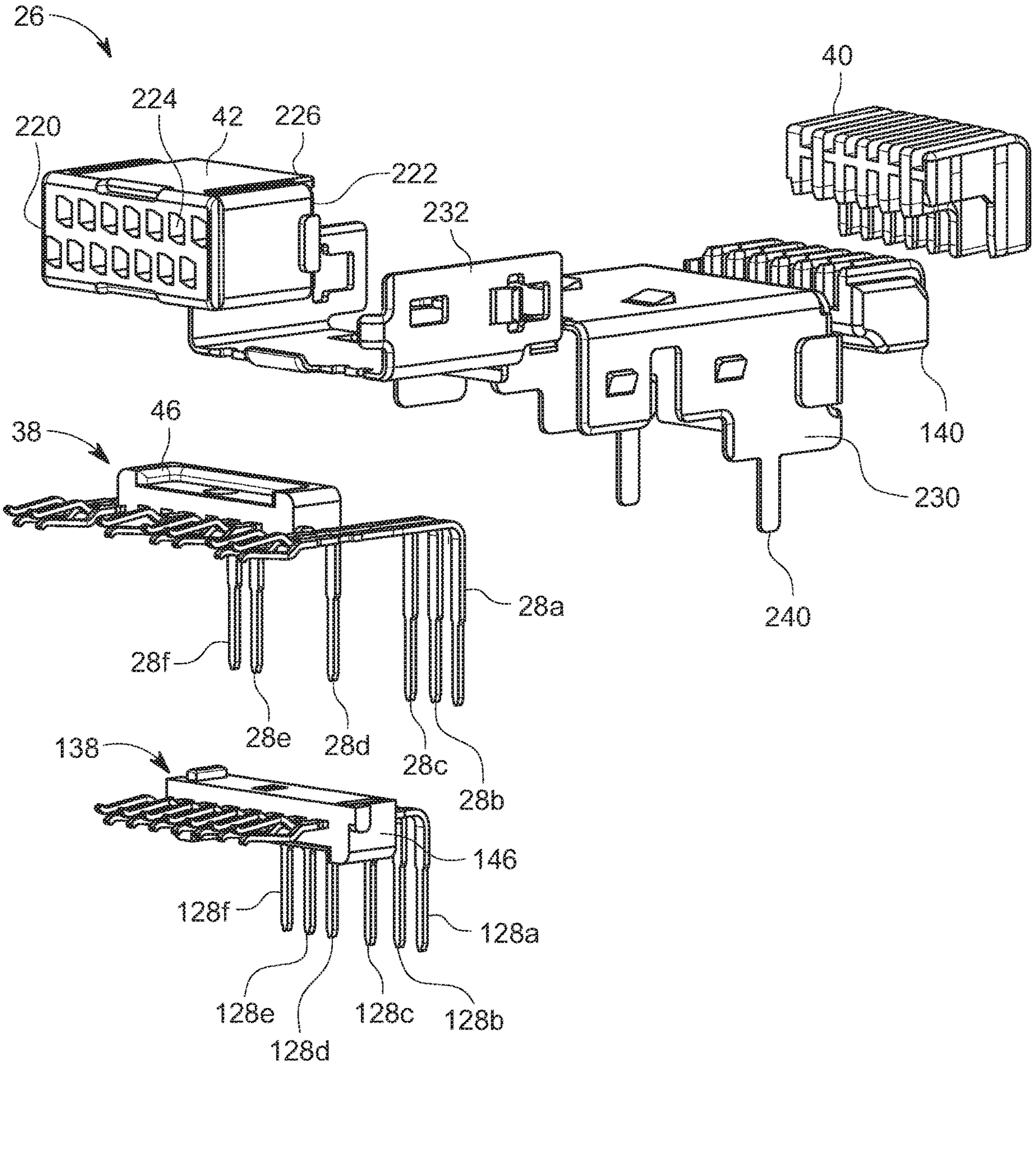
FIG. 3 depicts an exploded, rear perspective view of the terminal module.

As shown in FIG. 3, the rear housing 42 includes a rear connector mating end 220, an opposite front end 222 and a plurality of passageways 224 extending therebetween. The passageways 224 are provided in an array of rows and columns to correspond to the positions of the signal terminals 28*a-f*, 128*f*. The rear housing 42 may include engaging features 226 which seat within recesses 228 in the housings 46, 146 to secure the rear housing 42 to the stacked terminal blocks 38, 138. The signal terminals 28*a-f*, 128*f* extend into the passageways 224 for connection to the component 30.

As shown in FIG. 3, the shield 44 may be formed of an upper cover 230 and a lower base 232 which mate together and surround the terminal blocks 38, 138, the inserts 40, 140 and the housings 46, 146 to form a rear mating end 236 and a front component mount end 238. The cover 230 and the base 232 are U-shaped and interlock together to completely enclose the terminal blocks 38, 138, the inserts 40, 140 and the rear housing 42, other than at the rear mating end 236 and at the front component mount end 238. The rear mating end 236 is configured to engage a cooperating portion of the second connector. The cover 230 may include downwardly extending tails 240 configured to be inserted into and secured within plated through holes in a circuit board. The shield 44 may include locking structure for retaining the terminal blocks 38, 138, the inserts 40, 140 and the rear housing 42 therewithin. Top surfaces 114*a* of the horizontal portions 114 of the fins 76 engage with the cover 230 and bottom surfaces 216*a* of the vertical portions 216 of the fins 176 engage with the base 232.

Figure 26:
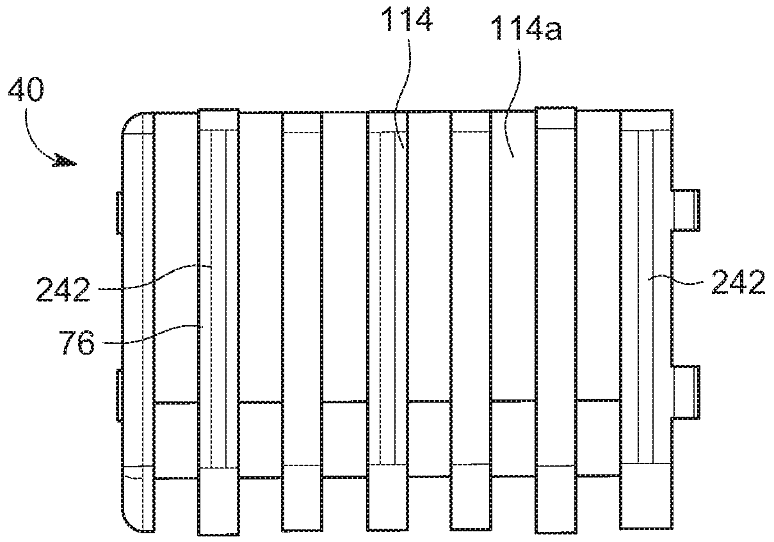
FIG. 26 depicts a top plan view of the upper insert according to an alternate embodiment.
Figure 27:
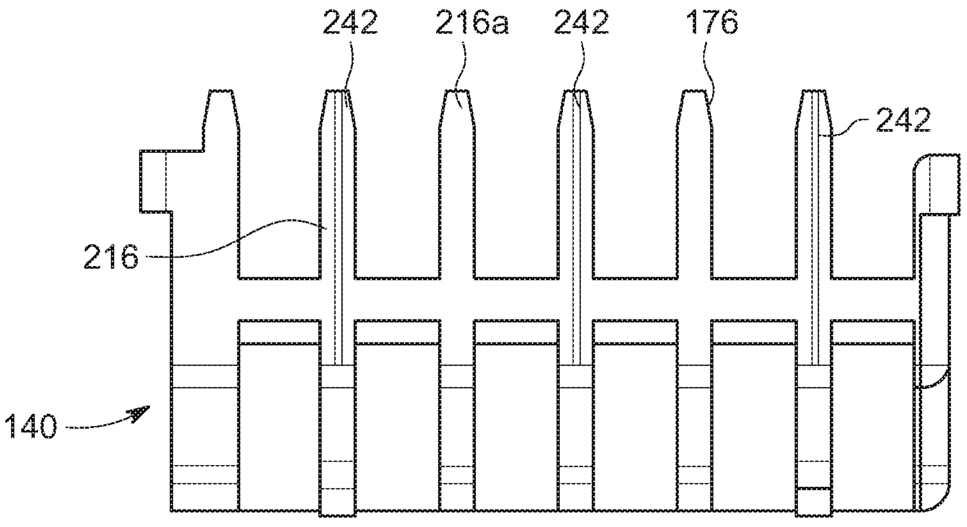
FIG. 27 depicts a bottom plan view of the lower insert according to the alternate embodiment.

In an embodiment, see FIGS. 26 and 27, crush ribs 242 are provided on one or more the top surfaces 114*a* of the fins 76 and on one or more of the bottom surfaces 216*a* of the fins 176 (or if the fins 76, 176 are eliminated then on the surface that engages with the cover 230 and the base 232 of the shield 44). In an alternative embodiment, the crush ribs are formed on the cover 230 and the base 232. When the cover 230 and base 232 are mated with the inserts 40, 140, the crush ribs 242 are crushed between the cover 230 and the fins 76 and the base 232 and the fins 176 to restrict movement and twist in all directions, as well as reference the assembled inserts 40, 140 to the shield 44. This further aids in the assembly and assists in controlling position. This maintains the position of the shield 44 to the terminals blocks 38, 138 and to the inserts 40, 140, further improving the electrical characteristics of the electrical connector 22.

Figure 28:
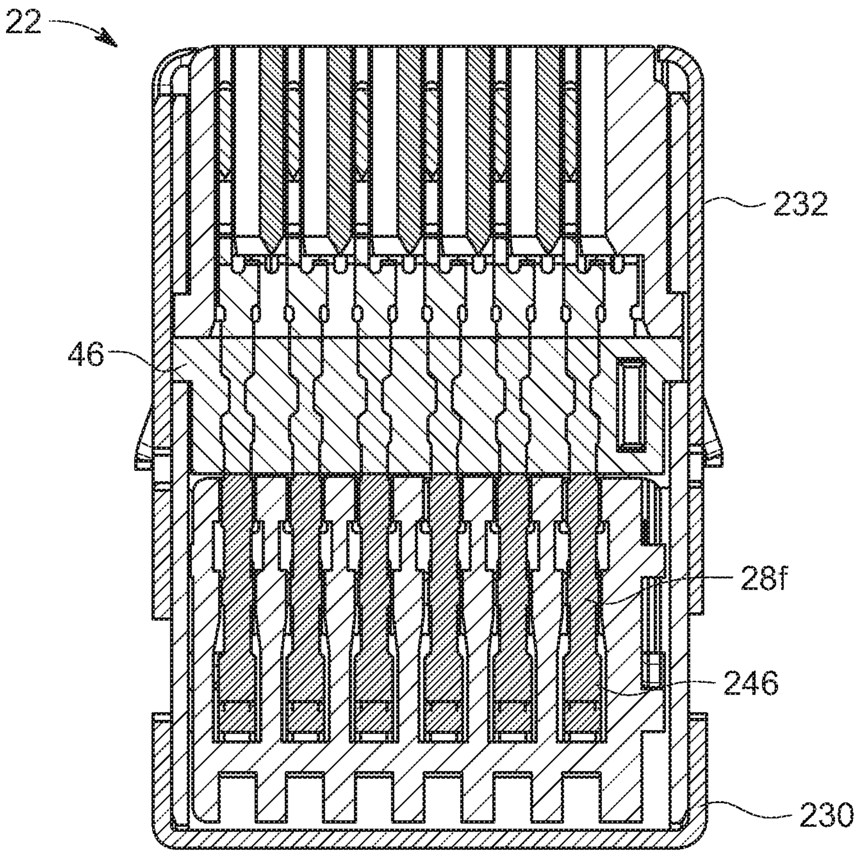
FIG. 28 depicts a cross-sectional view of the terminal module.

In an embodiment, each signal terminals 28*a-f* has a widened portion 246, see FIGS. 5 and 28, which forms wings on the signal terminals 28*a-f*. This provides for the signal terminals 28*a-f* to be closer together in this region to improve electrical properties. In some embodiments, each signal terminals 128*a-f* also has a widened portion. The provision of the fins 76, 176 further assists in improving electrical properties.

Figure 29:
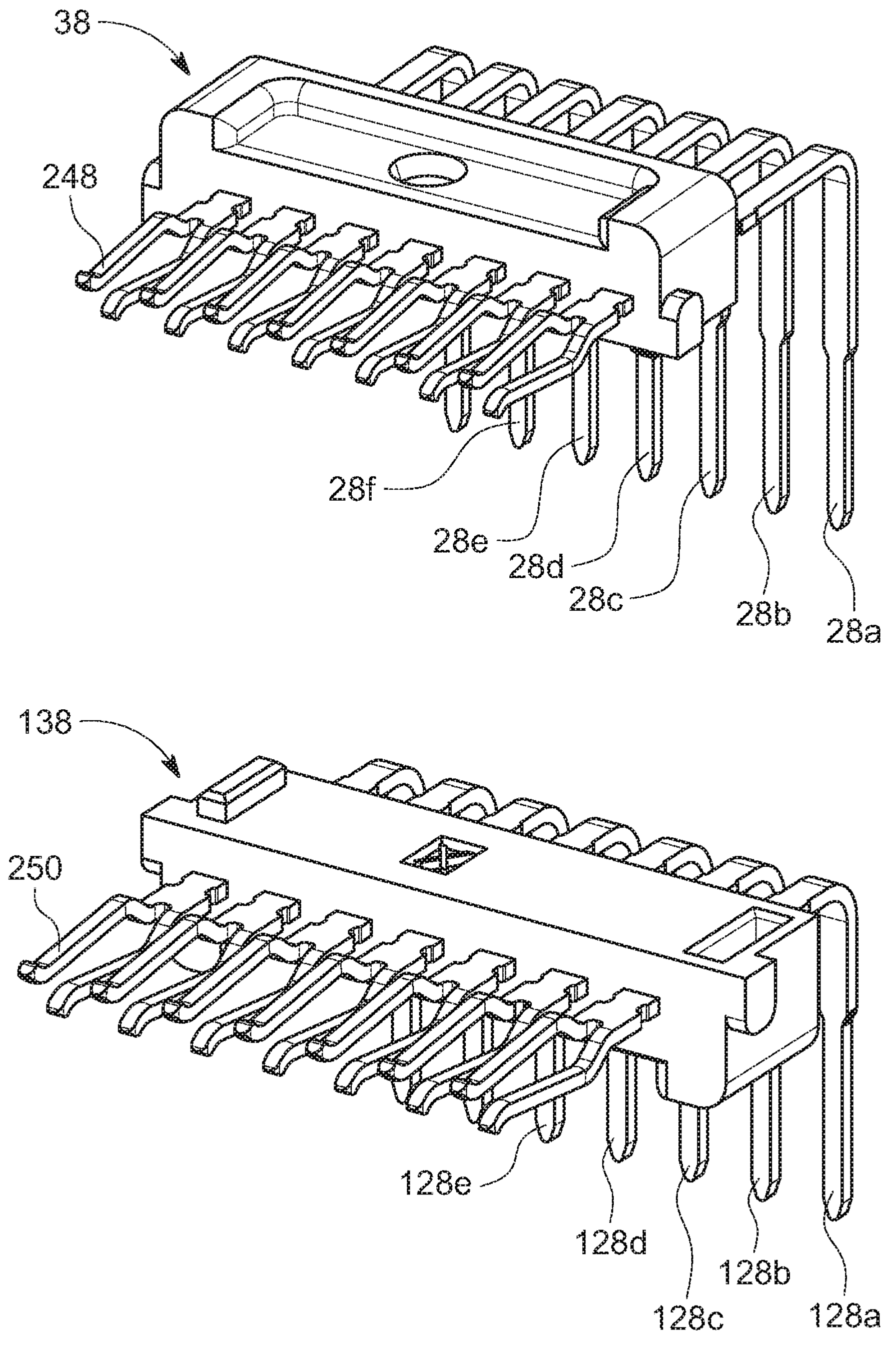
FIG. 29 depicts a rear perspective view of the upper and lower terminal modules in accordance with an alternate embodiment.

In an embodiment, in addition to the differential pairs of signal terminals 28*a-f*, 128*a-f*, power terminals 248, 250, see FIG. 29, are provided in the terminal module 26. The power terminal 248 extends through another passageway 58 through the housing 46 of the terminal block 38, and the power terminal 250 extends through another passageway 158 through the housing 146 of the terminal block 138. The inserts 40, 140 may, or may not, extend around the power terminals 248, 250. The power terminal 248 may be provided at any point along the row of signal terminals 28*a-f*, and the power terminal 250 may be provided at any point along the row of signal terminals 128*a-f*. If the power terminals 248, 250 are not provided at an end of the housings 46, 146, and the power terminals 248, 250 are not surrounded by the inserts 40, 140, each insert 40, 140 may be provided as two separate pieces.

Figure 30:
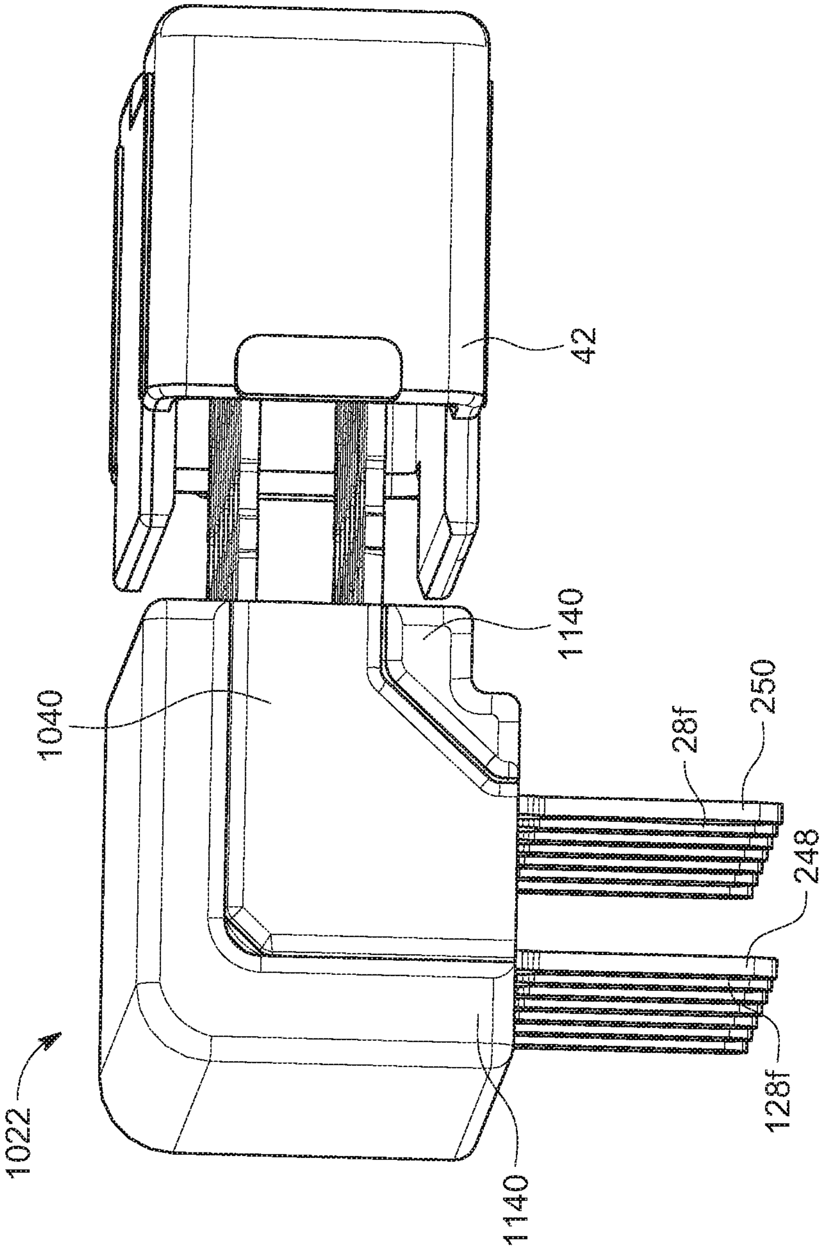
FIG. 30 is a front perspective view of an alternate embodiment of the inserts, and showing portion of a connector of the connector system.
Figure 31:
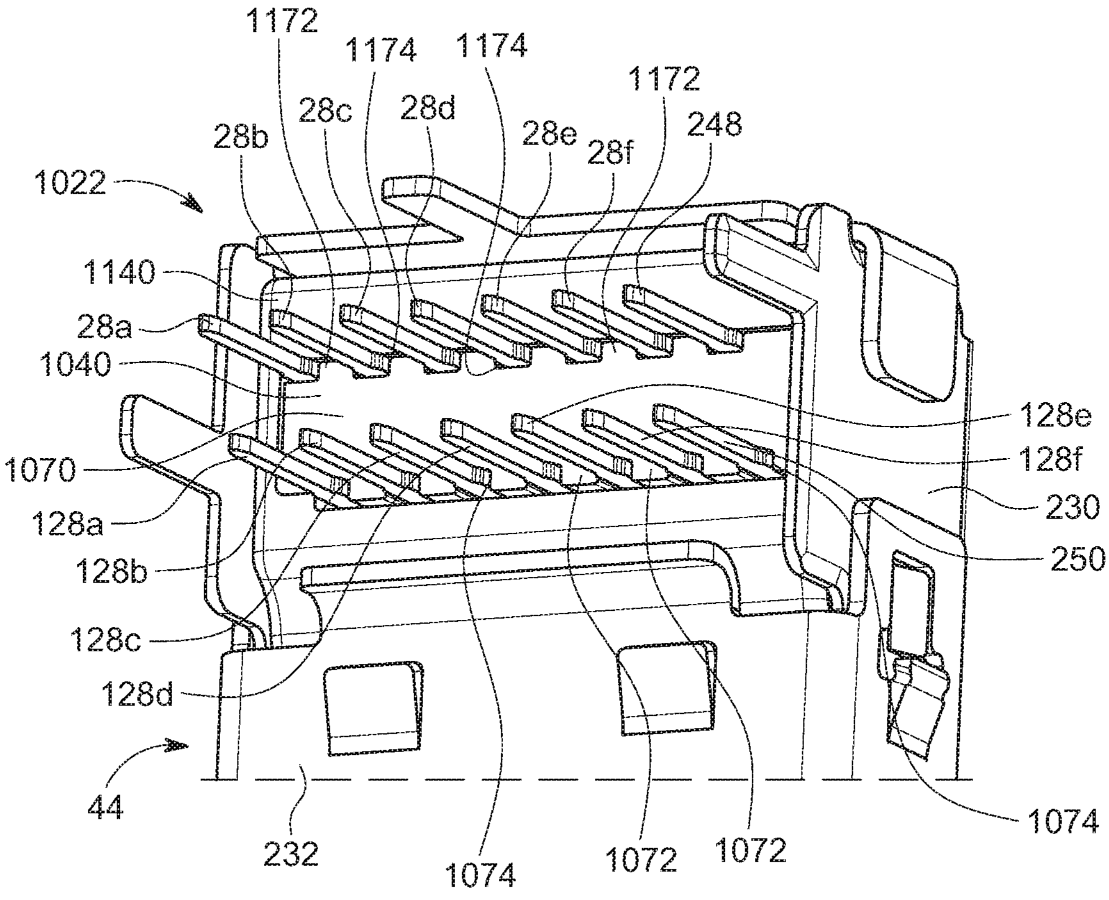
FIG. 31 is a bottom perspective view of the alternate embodiment of the inserts shown in FIG. 30, and showing portions of the connector.

Another embodiment of the electrical connector 1022 is shown in FIGS. 30 and 31. The electrical connector 1022 can be formed similar to the electrical connector 22 but may omit the inserts 1040, 1140. Therefore, the specifics of the stacked upper and lower terminal blocks 38, 138, the rear insulative housing 42 engaged with the terminal blocks 38, 138, and the electrically conductive shield 44 which secures the terminal blocks 38, 138, the inserts 1040, 1140 and the rear housing 42 together are not described.

The insert 1040 is insert molded between the row of the signal terminals 28*a-f* and the row of the signal terminals 128*a-f*. When the insert 1040 is insert molded, a base 1070 is formed between the row of the signal terminals 28*a-f* and the row of the signal terminals 128*a-f*, a plurality of spaced apart teeth 1072 extending from a first side thereof which define a plurality of spaced apart channels 1074 in which the tail sections 52 of the signal terminals 28*a-f* are seated as a result of the insert molding, and a plurality of spaced apart teeth 1172 extending from a second side thereof which define a plurality of spaced apart channels 1174 in which the tail sections 152 of the signal terminals 128*a-f* are seated as a result of the insert molding.

Thereafter, the insert 1140 is insert molded around a portion of the tail sections 52 of the signal terminals 28*a-f*, around a portion of the tail sections 152 of the signal terminals 128*a-f*, and around the insert 1040 and form passageways in which the tail sections 52, 152 are positioned. The insert 1140 may be insert molded around all but one of the sides of the insert 1040. As such, the inserts 1040, 1140 sandwich the signal terminals 28*a-f*, 128*a-f* therebetween. A portion of each tail section 152 extends outward of the passageways for connection to the other component 30.

The inserts 1040, 1140 are formed of a plastic material having dielectric constant (Dk) greater than 1 (air/vacuum). In an embodiment the dielectric constant of the plastic material of the inserts 1040, 1140 (dielectric constant, relative permittivity) is greater than 4.5. In an embodiment, the inserts 1040, 1140 is formed of a plastic resin having a glass content of 15%-30%. The inserts 1040, 1140 allows dielectric material to be positioned in areas between the signal terminals 28*a-f*, 128*a-f*, therefore adjusting dielectric constants between the signal terminals 28*a-f*, 128*a-f* and terminal pairs.

As shown, each tail section 52. 152 is L-shaped such that a right-angle electrical connector 1022 is formed. Alternatively, as discussed above, each tail section 52, 152 may be straight so as to provide a vertical connector instead of the depicted right angle connector.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. An electrical connector comprising:

a set of upper conductive signal terminals aligned in a upper row and a set of lower conductive signal terminals aligned in a lower row, each signal terminal including a mating interface section configured to mate with another electrical connector, an intermediate section extending from a rear end of the mating interface section, and a tail section extending from a rear end of the intermediate section and configured to mate with another component;

an upper insulative housing surrounding the intermediate sections of the upper signal terminals, the mating interface sections of the upper signal terminals extending rearwardly from the upper housing and the tail sections of the upper signal terminals extending forwardly from the upper housing;

a lower insulative housing surrounding the intermediate sections of the lower signal terminals, the mating interface sections of the lower signal terminals extending rearwardly from the lower housing and the tail sections of the lower signal terminals extending forwardly from the lower housing;

first and second insulative inserts partially surrounding the tail sections of the upper signal terminals and partially surrounding the tail sections of the lower signal terminals, the first insert being separately formed from the upper housing and from the second insert, and the second insert being separately formed from the lower housing and from the first insert, wherein the first and second inserts form a set of upper spaced apart passageways aligned in an upper row, the tail sections of the upper signal terminals extending through and outwardly from the upper passageways, and wherein the first and second inserts form a set of spaced apart lower passageways aligned in a lower row, the tail sections of the lower signal terminals extending through and outwardly from the lower passageways; and a conductive shield partially surrounding the housings and the inserts.

2. The electrical connector of claim 1, wherein the tail section of each upper signal terminal has a first length, and the tail section of each lower signal terminal has a second length, the first lengths are greater than the second lengths.

3. The electrical connector of claim 1, wherein the first insert includes a base and a plurality of spaced apart teeth extending from a side thereof which define a plurality of spaced apart upper channels, and the second insert includes a base and a plurality of spaced apart teeth extending from a side thereof which define a plurality of spaced apart lower channels, wherein the teeth of the first insert seat within the lower channels and the teeth of the second insert seat within the upper channels, wherein the upper passageways are defined between the base of the first insert and the teeth of the second insert, and wherein the lower passageways are defined between the base of the second insert and the teeth of the first insert.

4. The electrical connector of claim 3, wherein the base of the first insert has a horizontal portion and a vertical portion, each tooth of the first insert has a horizontal portion extending from the horizontal portion of the base of the first insert and ending at an end, and a vertical portion extending from the vertical portion of the base of the first insert and ending at an end; and wherein the base of the second insert has a horizontal portion and a vertical portion, each tooth of the second insert has a horizontal portion extending from the horizontal portion of the base of the second insert and ending at an end, and a vertical portion extending from the vertical portion of the base of the second insert and ending at an end.

5. The electrical connector of claim 4, wherein the horizontal portion of the base of the first insert is above the horizontal portion of the base of the second insert, and the vertical portion of the base of the first insert is forward of the vertical portion of the base of the second insert.

6. The electrical connector of claim 5, wherein the upper housing is stacked on top of the lower housing, the upper and lower housing including interengagements connecting the housings together.

7. The electrical connector of claim 3, wherein the first insert further includes a plurality of spaced apart fins extending from a side of the base thereof opposite to the side from which the teeth thereof extend, and the second insert includes a plurality of spaced apart fins extending from a side of the base thereof opposite to the side from which the teeth thereof extend.

8. The electrical connector of claim 3, wherein an end of each tooth is tapered.

9. The electrical connector of claim 3, wherein the upper housing is insert molded around the intermediate sections of the upper signal terminals and the lower housing is insert molded around the intermediate sections of the lower signal terminals.

10. The electrical connector of claim 1, wherein each upper passageway has a bend formed therein which is at a ninety degree angle and each tail section of the upper signal terminals has a bend formed therein which is at a ninety degree angle, and each lower passageway has a bend formed therein which is at a ninety degree angle and each tail section of the lower signal terminals has a bend formed therein which is at a ninety degree angle.

11. The electrical connector of claim 1, wherein the shield is formed of a cover and a base which mate together and interlock with each other.

12. The electrical connector of claim 11, wherein the one of the first insert and the cover has at least one crush rib extending therefrom which engages with and is crushed when the cover and the first insert are mated together, and one of the second insert and the base has at least one crush rib extending therefrom which engages with and is crushed when the cover and the second insert are mated together.

13. The electrical connector of claim 1, wherein the first and second inserts have at least one crush rib extending therefrom which engage with and are crushed by the shield.

14. The electrical connector of claim 1, wherein the upper housing is stacked on top of the lower housing, the upper and lower housing including interengagements connecting the housings together.

15. The electrical connector of claim 1, wherein the upper housing is insert molded around the intermediate sections of the upper signal terminals and the lower housing is insert molded around the intermediate sections of the lower signal terminals.

16. The electrical connector of claim 1, wherein the first and second inserts are formed of a material having a dielectric constant greater than 4.5.

17. The electrical connector of claim 1, wherein the upper signal terminals are arranged in differential pairs and the lower signal terminals are arranged in differential pairs, and further comprising an upper power terminal extending through the upper housing and a lower power terminal extending through the lower housing.

18. The electrical connector of claim 1, wherein the upper signal terminals are arranged in differential pairs and the lower signal terminals are arranged in differential pairs, and wherein each upper terminal has a widened portion.

19. The electrical connector of claim 1, further comprising a rear insulative housing having a plurality of passageways therethrough into which the mating interface sections of the terminal extend, the shield further partially surrounding the rear insulative housing.

20. The electrical connector of claim 1, wherein the first insert includes a base, a plurality of spaced apart teeth extending from an upper side of the base which define a plurality of spaced apart upper channels, and a plurality of spaced apart teeth extending from a lower side of the base which define a plurality of spaced apart lower channels, and the second insert surrounds a portion of the first insert thereby forming the upper and lower spaced apart passageways.

* * * * *